US006322928B1

(12) United States Patent
Thackeray et al.

(10) Patent No.: US 6,322,928 B1
(45) Date of Patent: Nov. 27, 2001

(54) MODIFIED LITHIUM VANADIUM OXIDE ELECTRODE MATERIALS AND PRODUCTS

(75) Inventors: Michael M. Thackeray, Naperville; Arthur J. Kahaian, Chicago, both of IL (US); Keith D. Kepler, Mountain View, CA (US); Donald R. Vissers, Naperville, IL (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/404,982

(22) Filed: Sep. 23, 1999

(51) Int. Cl.[7] ............................. H01M 4/48; C01G 31/02
(52) U.S. Cl. .................. 429/231.2; 423/596; 252/182.1
(58) Field of Search .............................. 429/231.1, 231.2, 429/231.3, 231.95; 423/593–596; 252/182.1

(56) References Cited

U.S. PATENT DOCUMENTS

| 4,803,137 | 2/1989 | Miyazaki et al. . |
| 5,013,620 | 5/1991 | Miyazaki et al. . |
| 5,196,278 | 3/1993 | Idota . |
| 5,221,453 | 6/1993 | Crespi . |
| 5,260,147 | 11/1993 | Delmas et al. . |
| 5,326,545 | 7/1994 | Koksbang et al. . |
| 5,334,334 | 8/1994 | Koksbang . |
| 5,336,572 | 8/1994 | Koksbang . |
| 5,389,472 | 2/1995 | Takeuchi et al. . |
| 5,418,091 | 5/1995 | Gozdz et al. . |
| 5,425,932 | 6/1995 | Tarascon . |
| 5,453,337 | 9/1995 | Willmann et al. . |
| 5,478,671 | * 12/1995 | Idota . |
| 5,576,120 | 11/1996 | Saidi .................................... 429/218 |
| 5,616,309 | 4/1997 | Zachau-Christiansen et al. . |
| 5,618,640 | 4/1997 | Idota et al. . |
| 5,631,104 | 5/1997 | Zhong et al. . |
| 5,674,645 | 10/1997 | Amatucci et al. . |

(List continued on next page.)

FOREIGN PATENT DOCUMENTS

| 0 394 917 | 10/1990 | (EP) . |
| 0 397 608 | 11/1990 | (EP) . |
| 6-349491 | 12/1994 | (JP) . |
| 7-33443 | 2/1995 | (JP) . |
| WO 99/30378 | 6/1999 | (WO) . |

OTHER PUBLICATIONS

Author Unknown, "Lithium/Manganese Dioxide (Li/MnO$_2$) Cells," *Primary Batteries*, 1 page (Date Unknown).
Dahn et al., "Rechargeable LiNiO$_2$/Carbon Cells," *J. Electrochem. Soc.*, 138(8), pp. 2207–2211 (Aug. 1991).
de Kock et al., "Defect Spinels In the System Li$_2$O.yMnO$_2$ (y>2.5): A Neutron–Diffraction Study And Electrochemical Characterization of Li$_2$Mn$_4$O$_9$," *Mat. Res. Bull.*, 25, pp. 657–664 (1990). No Month.
de Picciotto et al., "Structural characterization of Li$_{1+x}$V$_3$O$_8$ insertion electrodes by single–crystal X–ray diffraction," *Solid State Ionics*, 62, pp. 297–307 (1993). No Month.
Gummow, "Improved capacity retention in rechargeable 4V lithium/lithium–manganese oxide (spinel) cells," *Solid State Ionics*, 69, pp. 59–67 (1994). No Month.

(List continued on next page.)

*Primary Examiner*—Carol Chaney
*Assistant Examiner*—Susy Tsang
(74) *Attorney, Agent, or Firm*—Mueting, Raasch & Golohardt, PA

(57) ABSTRACT

Improved lithium vanadium oxide formulations are presented having a nominal formula of $Li_xV_{3-\delta}M_\delta O_y$. Herein preferred cation doped vanadium oxide materials, electrodes using such materials, and electrochemical cells including at least one electrode therein comprising such materials are provided.

17 Claims, 18 Drawing Sheets

U.S. PATENT DOCUMENTS

| | | |
|---|---|---|
| 5,683,672 | 11/1997 | Sekai . |
| 5,698,338 | 12/1997 | Barker et al. . |
| 5,700,598 * | 12/1997 | Denis et al. . |
| 5,759,720 | 6/1998 | Amatucci . |
| 6,004,697 | 12/1999 | Thackeray et al. . |

OTHER PUBLICATIONS

Guyomard et al., "High voltage stable liquid electrolytes for $Li_{1+x}Mn_2O_4$/carbon rocking–chair lithium batteries," *Journal of Power Sources*, 54, pp. 92–98 (1995). No Month.

*Handbook of Batteries*, 2d Ed., Edited by D. Linden et al., McGraw–Hill, 1995 (Title page, Publication page, and Table of Contents). No Month.

Mizushima et al., "$Li_xCoO_2$ (0<x≤1): A New Cathode Material For Batteries of High Density," *Solid State Ionics*, ¾, pp. 171–174 (1981). No Month.

Ozawa, "Lithium–ion rechargeable batteries with $LiCoO_2$ and carbon electrodes: the $LiCoO_2$/C system," *Solid State Ionics*, 69, pp. 212–221 (1994). No Month.

Panero et al., "Rechargeable Li/$Li_{1+x}V_3O_8$ Cells," *J. Electrochemical Society*, 130(5), pp. 1225–1227 (May 1983).

Pasquali et al., "Li/$Li_{1+x}V_3O_8$ Batteries V. Comparison with Other Secondary Cells and Influence of Micro– and Macro–Structural Alterations on the Cathode Performance," *J. Electrochemical Society*, 133(12), pp. 2454–2458 (Dec. 1986).

Pistoia et al., "Li/$Li_{1+x}V_3O_8$ Secondary Batteries III. Further Characterization of the Mechanism of Li+ Insertion and of the Cycling Behavior," *J. Electrochemical Society*, 132(2), pp. 281–284 (Feb. 1985).

Pistoia et al., "Li/$Li_{1+x}V_3O_8$ Secondary Batteries Synthesis and Characterization of an Amorphous Form of the Cathode," *J. Electrochemical Society*, 137(8), pp. 2365–2370 (Aug. 1990).

Pistoia et al. "Solid Solutions $Li_{1+x}V_3O_8$ As Cathodes For High Rate Secondary Li Batteries," *Solid State Ionics*, 13, pp. 311–318 (1984). No Month.

Pistoia et al., Thermodynamic Study of Lithium Insertion in $V_6O_{13}$ and $Li_{1+x}V_3O_8$, *Solid State Ionics*, 20, pp. 25–30 (1986). No Month.

Raghavan et al., "Composite Polymer Electrolytes Based On Fumed Silica: Mechanical Response And Processability," *Electrochemical Society Proceedings*, 96–17, pp 74–83. No Month.

Spahr et al., "Electrochemistry of Chemically Lithiated $NaV_3O_8$: A positive Electrode Material for Use in Rechargeable Lithium–Ion Batteries," *J. Electrochemical Society*, 145(2), pp. 421–427 (Feb. 1998).

Tarascon et al., "An update of the Li metal–free rechargeable battery based on $Li_{1+x}Mn_2O_4$ cathodes and carbon anodes," *Journal of Power Sources*, 43–44, pp. 689–700 (1993). No Month.

Tarascon et al., "Li Metal–Free Rechargeable Batteries Based on $Li_{1+x}Mn_2O_4$ Cathodes (O ≤x≤1) and Carbon Anodes," *J. Electrochem. Soc.*, 138(10), pp. 2864–2868 (1991). No Month.

Tarascon et al., "Synthesis Conditions and Oxygen Stoichiometry Effects on Li Insertion into the Spinel $LiMn_2O_4$," *J. Electrochem. Soc.*, 141(6), pp. 1421–1431 (1994). No Month.

Tarascon et al., "The $Li_{1+x}Mn_2O_4$/C Rocking–Chair System: A Review," *Electrochemica Acta*, 38(9), pp. 1221–1231 (1993). No Month.

Tarascon et al., "The $Li_{1+x}Mn_2O_4$/C system Materials and electrochemical aspects," *Journal of Power Sources*, 54, pp. 103–108 (1995). No Month.

Tarascon et al. "The Spinel Phase of $LiMn_2O_4$ as a Cathode in Secondary Lithium Cells," *J. Electrochem. Soc.*, 138(10), pp. 2859–3864 (1991). No Month.

Thackeray et al., "Electrochemical Extraction Of Lithium From $LiMn_2O_4$," *Mat. Res. Bull.*, 19, pp. 179–187 (1984). No Month.

Thackeray et al., "Spinel Electrodes from the Li–Mn–O System for Rechargeable Lithium Battery/Applications," *J. Electrochem. Soc.*, 139(2), pp. 363–366 (1992). No Month.

Wadsley, "Crystal Chemistry of Non–stoichiometric Pentavalent Vanadium Oxides: Crystal Structure of $Li_{1+x}V_3O_8$," *Acta Crystallographica*, 10, pp. 261–267 (1957). No Month.

West et al., "Comparison of $LiV_3O_8$ Cathode Materials Prepared by Different Methods," *J. Electrochemical Society*, 143(3), pp. 820–825 (Mar. 1996).

* cited by examiner

MODIFIED LITHIUM VANADIUM OXIDE ELECTRODE MATERIALS AND PRODUCTS

FIELD OF THE INVENTION

The present invention relates to certain modified lithium vanadium oxides. Included are preferred oxides according to the general formula $Li_xV_{3-\delta}M_\delta O_8$, wherein M can be a variety of cations (or a mixture of cations). The invention concerns the utilization of such oxide materials as electrode materials, for example, as cathode materials in lithium batteries. The disclosure concerns preferred formulations of such materials, preferred methods for preparation, products including such materials and methods of use.

BACKGROUND OF THE INVENTION

The negative electrode (anode) of a high density lithium battery typically comprises one or more of a variety of any suitable lithium-containing substances such as: metallic lithium; lithium-metal alloys; lithium metal oxides; or, lithium carbon composites. The positive electrode (cathode) is typically a lithium vanadium oxide of the formula $LiV_3O_8$. The electrodes may be coupled using a liquid electrolyte or a solid electrolyte such as a solid polymer electrolyte, or a combination of liquid and solid electrolytes. The electrolyte may specifically be a "plasticized" electrolyte in which a liquid electrolyte component is contained within a polymer electrolyte. During discharge, lithium ions are electrochemically inserted into the lithium vanadium oxide structure by a process that is commonly referred to as intercalation. A reverse process occurs during charge. The vanadium ions of the host electrode structure are reduced and oxidized during discharge and charge, respectively. Conversely, the negative electrode is oxidized during discharge when lithium ions are released from the electrode into the electrolyte, and it is reduced during the reverse process on charge. Lithium ions, therefore, shuttle between the two electrodes during the electrochemical discharge and charge processes.

It is advantageous for batteries, such as lithium batteries, to have a high electrochemical "capacity" or energy storage capability. In lithium batteries, this can be achieved if the positive and negative electrodes can accommodate a significant amount of lithium. Furthermore, in order to have a good cycle life, the positive and negative electrodes should preferably have the ability to accommodate and release lithium in a reversible manner, i.e., without significant "capacity fade." Thus, preferably, the structural integrity of the electrodes should be maintained during lithium insertion/extraction for numerous cycles.

SUMMARY OF THE INVENTION

According to the present invention, a vanadium oxide material doped with one or more cations is provided. The invention also concerns the provision of electrodes including lithium vanadium oxide according to the preferred general formula; and, batteries including an electrode as characterized.

In one embodiment, the present invention provides a vanadium oxide material according to the average formula:

$$Li_xV_{3-\delta}M^\alpha O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents a mixture of at least two different cations.

In a second embodiment, the present invention provides a vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents Mo, Cr, Nb, or mixtures thereof.

In a third embodiment, the present invention provides an electrode having a vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents a mixture of at least two different cations.

In a fourth embodiment, the present invention provides an electrode having a vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents Mo, Cr, Nb, or mixtures thereof.

In a fifth embodiment, the present invention provides an electrochemical cell having a cathode containing a vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents a mixture of at least two different cations.

In a sixth embodiment, the present invention provides an electrochemical cell having a cathode containing a vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;

(d) x and y are selected such that the average, calculated oxidation state of V is at least 4.7; and (e) M represents Mo, Cr, Nb, or mixtures thereof.

DETAILED DESCRIPTION OF PREFERRED EMBODIMENTS

Figure 1:
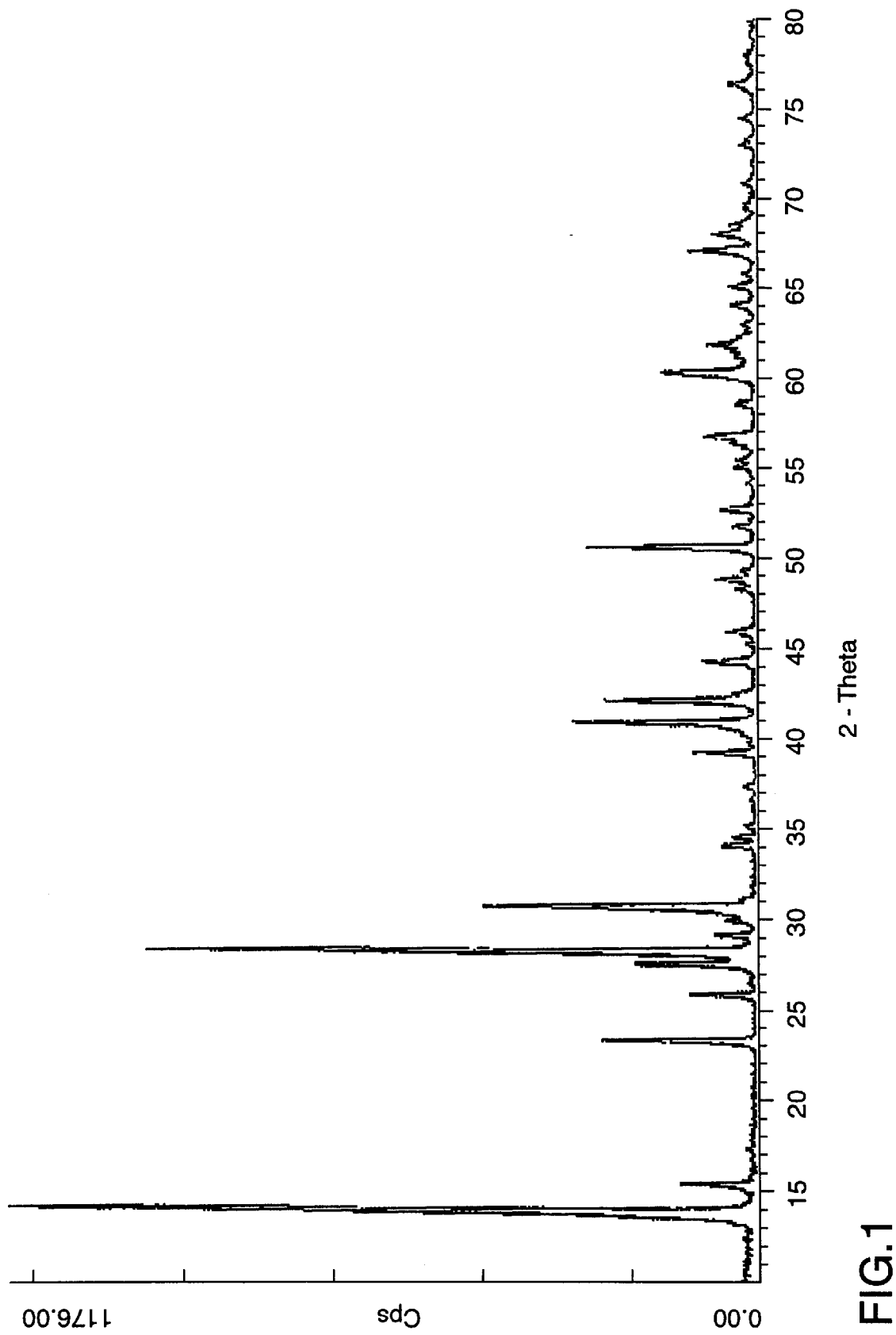
FIG. 1 is the powder X-ray diffraction pattern of a standard $Li_{1.2}V_3O_8$ material.

I. A General Description of Lithium Vanadium Oxide Electrode Materials

A preferred vanadium oxide electrode material, for use with respect to lithium batteries of concern to the present invention will be referenced generally as having a nominal formula of $Li_xV_3O_y$, wherein x is non-zero, preferably about 1.0 to about 1.5, and more preferably about 1.2, y is preferably greater than about 7.8 and no greater than about 8.2, and more preferably about 8.0. The crystalline structure of this material is relatively stable, and is favorable with respect to intercalation. This nominal or base formula is the approximate formula at complete charge. Oxides of this nominal formula $Li_xV_3O_y$ exhibit distinctive X-ray diffraction patterns (XRD) and crystalline structures, as discussed below.

The specific preferred stoichiometry for the most stable electrode in the completely charged state is $Li_{1.2}V_3O_8$. By this it is meant that the preferred material is formulated from precursor materials such that in a fully charged cell the average formulation of the cathode, with respect to the vanadium oxide component, is $Li_{1.2}V_3O_8$. The average (calculated) vanadium valence in $Li_{1.2}V_3O_8$ is 4.933 or "nominally" 5.

As the battery is discharged, lithium cations are inserted into the crystalline $Li_{1.2}V_3O_8$ electrode structure. This reduces the average oxidation state of the vanadium ions from 4.933 in $Li_{1.2}V_3O_8$ to 4.0 in $Li_4V_3O_8$, which represents the approximate composition of the positive electrode in a discharged cell.

According to the present invention, the nominal $Li_xV_3O_y$ structure (wherein x and y are as defined above) typically and preferably $Li_{1.2}V_3O_8$, is modified to advantage. The modification, in part, concerns "doping" the crystalline structure with one or more cations.

II. Preferred Modified Electrode Materials

In further embodiments of the present invention, substitution of vanadium by another element, preferably a cation in addition to lithium, is used. This can also be a method of maintaining the average, calculated oxidation state of vanadium at a value of at least 4.7 (preferably at least 4.8, more preferably at least 4.85, even more preferably at least 4.9, and most preferably at or near 4.933) in the fully charged state. By definition the oxidation state of vanadium is no greater than 5.0, and preferably no greater than 4.95.

Substitution of one or more (preferably, two or more) cations, particularly one or more (preferably, two or more) metal cations, for some of the vanadium in the material results in a general formula as follows: $Li_xV_{3-\delta}M_\delta O_y$, wherein x and y are as defined above, and δ is greater than zero and typically no greater than about 1.0. A base formula for a preferred group of such stabilized compounds would be as follows: $Li_{1.2}V_{3-\delta}M_\delta O_8$ wherein M is a cation (or mixture of two or more cations). Suitable cations are those that are sufficiently small such that they can fit into sites previously occupied by vanadium (typically, octahedral sites) and/or sites previously occupied by lithium (typically, octahedral or tetrahedral sites). In general, it is preferred to use a cation M (or mixture of two or more cations M), which does not, in the amounts used, generate a significant amount of a second impurity phase along with $Li_{1.2}V_3O_8$.

Preferred cations, M, are those selected from Mg, Al, Si, P, Sc, Ti, Cr, Mn, Fe, Co, Ni, Cu, Zn, Ge, Y, Zr, Nb, Ta, Mo, La, Hf, W, or mixtures thereof. More preferred cations, M, are those that form strong M—O bonds, such as Mg, Al, Si, Sc, Ti, Y, Zr, Mo, or mixtures thereof. For certain particularly preferred embodiments, the cations, M, are Mo, Cr, Nb, or mixtures thereof. For certain other particularly preferred embodiments, the cations, M, are Mg, Al, Y, Ti, Zr, Mo, or mixtures thereof. Of these, titanium and/or zirconium are particularly preferred, although other cations and even mixtures, can be used. The titanium or zirconium doped systems are advantageous because of the relatively strong titanium-oxygen or zirconium-oxygen bonds in the crystal structure. It can be reasoned that such bonds will serve to strengthen and maintain the integrity of the overall crystal structure, particularly during cell operation when lithium is being repeatedly inserted into and extracted from the structure, and to suppress oxygen loss from the structure as the electrode approaches the fully charged state.

In various embodiments of the present invention, it is possible to use two or more different cations as substituents for some of the vanadium ions. For example, it is possible to replace two pentavalent vanadium ions ($V^{5+}$) in the lithium-vanadium-oxide crystal lattice by one hexavalent molybdenum ($Mo^{6+}$) ion and one tetravalent zirconium ($Zr^{4+}$) or titanium ($Ti^{4+}$) ion. In this instance, substitution of two metal cations for some of the vanadium in the material results in the general formula: $Li_{1.2}V_{3-2\delta}M'_\delta M''_\delta O_8$. Thus, as an example, for $M'=Mo^{+6}$, $M''=Ti^{+4}$, $\delta=0.1$, a preferred formula would be:

$$Li_{1.2}V_{2.8}Mo_{0.1}Ti_{0.1}O_{8.0}$$

III. Methods of Preparation

Materials according to the present invention can be readily prepared by modifications of known techniques for the manufacture of $Li_{1.2}V_3O_8$. For example, $Li_{1.2}V_3O_8$ electrode materials can be prepared by mixing $LiOH.H_2O$ with $NH_4VO_3$ and suspending the mixture in methanol to form a reaction mixture. This reaction mixture is preferably subsequently milled for a time period of about 24 hours to about 48 hours, and the remaining methanol removed (e.g., by evaporation), resulting in a dry solid precursor of $Li_{1.2}V_3O_8$. The precursor can then be heated to a temperature of about 20° C. to about 400° C., at a heating rate of about 1° C./minute for a time period of about 24 hours, and then cooled to room temperature at a cooling rate of about 1° C./minute. The resulting product may then be ground to a fine powder, for example, by high energy ball milling during which the powders are agitated at high frequency (for example, in a spherical stainless steel container with one steel grinding ball in a Spex #8000D Miller/Mixer (Metuchen, N.J.)) for about 96 hours or less. This milling process reduces the particle size significantly and eliminates the need for fluorine doping to reduce particle size.

In addition to employing vanadium cations in preparing materials of the invention, other metal cations may also be introduced into the crystal structure of the lithium vanadium oxide material. For example, titanium may be introduced into the reaction mixture prepared above by the further addition of $Ti[OCH(CH_3)_2]_4$. Similarly, zirconium and molybdenum may also be introduced to the reaction mixture by the addition of $Zr[OCH(CH_3)_2]_4$. $(CH_3)_2CHOH$ and $MoO_3$, respectively. Additionally, other metal cations that may be added to the reaction mixture include yttrium and scandium. Yttrium may be introduced into the reaction mixture by the addition of $Y_5O[OCH(CH_3)_2]_{13}$. Scandium may be introduced into the reaction mixture by the addition of $Sc[OCH(CH_3)_2]_3$. For other cations, the precursor compounds can be selected from oxides, hydroxides, alkoxides, oxalates, acetates, nitrates, or mixtures thereof.

Electrodes can be prepared from the oxide base material by coating onto a metallic current collector a slurry containing the oxide base, a polymeric binder such as polyvinylidinefluoride (PVDF), an electrically conductive. particle such as conductive carbon particles, and a solvent such as toluene. This coating is then dried to form the electrode.

Advantageously, preparation of the materials according to the present invention may be accomplished without fluorine doping and with surprising stability.

IV. Some Theories for Certain Observed Stabilization Effects

Electrode materials of the type described herein would typically be used in high energy density lithium storage batteries. The capacity fade that occurs with cycling for certain types of such batteries (repeated discharge and charge) can be attributed to a number of possible factors. $Li_{1.2}V_3O_8$ has a layered-type crystal structure. During discharge, lithium ions are inserted into a $Li_{1.2+x'}V_3O_8$ structure (typically $0 \leq x' \leq 2.8$). Capacity fade phenomena could result, for example, either from (1) structural fatigue due to anisotropic variations in the lattice parameters during charge and discharge, or (2) migration of vanadium ions from their original positions into the layers occupied by lithium, thereby, restricting lithium mobility, or (3) the dissolution of some vanadium containing species from the crystal lattice into the electrolyte, or (4) a loss of oxygen from the electrode structure at or near the fully charged state, or various combinations of (1), (2), (3), and (4).

In preferred lithium vanadium oxide cathode arrangements according to the present invention, at the "top of the charge," the vanadium is in an average oxidation state approaching $V^{5+}$ (typically and preferably about 4.933, more generally at least 4.7) and at the end of discharge it is closer to $V^{4+}$. Vanadium in lower oxidation states (such as $V^{3+}$) is believed to be somewhat more soluble in certain electrolytes than at higher oxidation states (such as $V^{4+}$). This could be partly responsible for some of the observed deterioration of the cathode operation, with cycling for certain types of batteries.

Without being bound to any particular theory, it is presently believed that the M-cation doped systems are stabilized by introduction of the M cations into the crystal structure. Related samples with fluorine doping (i.e., substitution of fluoride ions for oxygen ions in the crystal structure) disclosed in U.S. patent application Ser. No. 08/985,441 (filed Dec. 5, 1997) have previously shown improved electrochemical performance, the reasons for which are now more completely understood. Scanning electron microscopy revealed that one feature of fluorine doping was to reduce the particle size of the standard $Li_{1.2}V_3O_8$ samples. It has now been discovered that this physical property of the material can be achieved by alternative processing methods without the necessary use of fluorine, for example by high energy ball milling of the $Li_{1.2}V_3O_8$ to reduce particle size. Furthermore, using fluorine-based materials in laboratory and production processes is generally neither desirable nor advantageous because of their high chemical reactivity and the special handling procedures typically required. It is now believed that the reason for the improved stability of the metal oxide framework by transition metal substitution for vanadium can be attributed to differences in strength between vanadium-oxygen and M-oxygen bonds, although the invention is not necessarily limited by this theory. Therefore, it is believed that the introduction of M cations into the structure, in the absence of fluorine, may add integrity to the vanadium oxide crystalline structure, as a result of the introduction of strong M-oxygen bonds. The net result of this could be inhibiting vanadium migration, inhibiting solubility, and/or suppressing oxygen loss at the top of charge, although this should not be limiting to the invention. Thus, in some instances, the slight modification to the electrode composition and crystal structure may manifest itself by a lessening of capacity fade.

In general, the preferred formulations provided are arrived at by focusing on two principal factors:

1. A desire to maintain the vanadium valence state at the top of charge, as close to 4.933 as reasonably possible, and more generally at least 4.7 (preferably at least 4.8, more preferably at least 4.85, even more preferably at least 4.9, and most preferably at or near 4.933) in the stabilized $Li_xV_3O_y$ (preferably $Li_{1.2}V_3O_8$) crystal structure; and 2. Introduction of no more M cations into the crystalline structure than is useful to achieve the desired level of stabilization, because of a desire not to greatly depart from the stoichiometry of the $Li_{1.2}V_3O_8$ base (i.e., to maximize the available capacity of the electrode), and to avoid the use of fluorine (a chemically aggressive reagent) in the oxide.

In general, the crystalline structure of $Li_{1.2}V_3O_8$ is layered. In the standard structure, three vanadium ions and one lithium ion typically occupy octahedral sites in the $Li_{1.2}V_3O_8$ structure; the remaining 0.2 lithium ions occupy tetrahedral sites. During discharge, the lithium ions migrate into neighboring octahedral sites to generate a stable defect rocksalt structure, $Li_4V_3O_8$, which is the approximate composition at the end of discharge. The stoichiometric rocksalt composition, $Li_5V_3O_8$, is not easily attainable at the end of the electrochemical discharge.

V. General Formulae of Preferred Materials Based on the Above-Recited Principles and Descriptions.

A general formula of a preferred vanadium oxide material, useable as a cathode material as described above at least when defined in the charged state, would be as follows:

$$Li_xV_{3-\delta}M_\delta O_y$$

wherein preferably:

(a) $0<\delta\leq1.0$ (more preferably $0.05\leq\delta\leq0.3$);

(b) $7.8<y\leq8.2$;

(c) x is non-zero (typically and preferably $1.0\leq x\leq1.5$ and more preferably x is about 1.2);

(d) x and y are selected such that the average, calculated oxidation state of V is at least 4.7; and, (e) M represents a cation (preferably, at least two different cations). Suitable cations are those that are sufficiently small that they can fit into sites previously occupied by vanadium (typically, octahedral sites) and/or sites previously occupied by lithium (typically, octahedral or tetrahedral sites).

Preferred electrodes comprise a vanadium oxide material according to the formulae recited above; and, preferred battery constructions include at least one preferred electrode as characterized. The values of x, δ, and y are average values.

It should be appreciated that in some instances M may be a mixture of cations and thus the term "$M_\delta$" is intended to include mixtures of cations. In such instances the limitation on "δ" is intended to be on the averaged cation "M" resulting from averaging the valence of the various M', M", etc., using a mole-weighted, valence-charge-balance formula consistent with the general formula $Li_xV_{3-\delta}M_\delta O_y$, Particularly preferred electrodes which contain a mixture of cations are those in which M is derived from Mg, Al, Y, Ti, Zr, and Mo.

As indicated above, the formulae given herein for the preferred vanadium oxide materials are generally in reference to the material as it would be found in an electrode in the fully charged state (i.e., upon initial synthesis of the material). During discharge, and intercalation, a lithium ion introduction will modify the formulae.

VI. An Example of Battery Construction

Typically battery constructions that can use the preferred cathode materials according to the present invention include otherwise conventional coin cells, wound cells, and stacked cells in which the cathode oxide is replaced with the preferred oxide(s) described herein. Various useable conventional constructions are described in *Handbook of Batteries,* 2d Ed., edited by D. Linden et al., McGraw-Hill, 1995.

Figure 18:
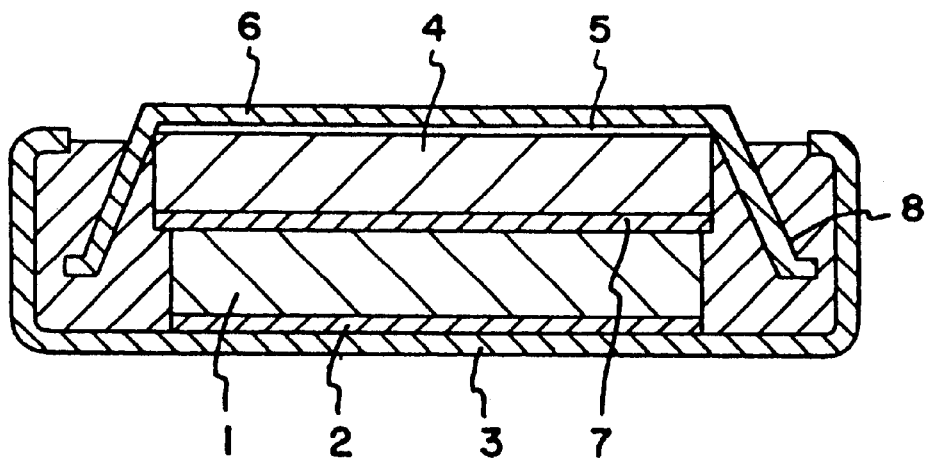
FIG. 18 is a schematic representation of an electrochemical cell.

An example cell is shown in FIG. 18. The cell may generally be made according to the description of U.S. Pat. No. 4,803,137 (Mayazaki et al.), except in that the cathode includes a vanadium oxide material as described herein. Referring to FIG. 18, the cell depicted includes: a cathode 1; a positive electrode current collector 2; a positive electrode casing 3; an anode 4; a negative electrode current collector 5; a negative electrode casing 6; separator/electrolyte 7; and, insulating polypropylene gasket 8. With a vanadium oxide material as described herein, the cell would operate in the otherwise typical fashion.

Figure 19:
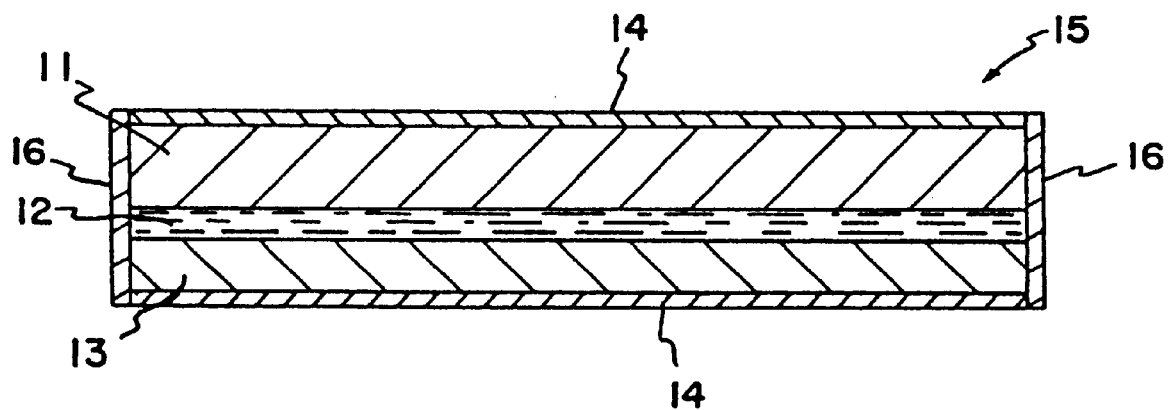
FIG. 19 is a second schematic representation of an electrochemical cell.

Another schematic illustration of the electrochemical cell is shown in FIG. 19. The cell is designated 15, and the anode (negative electrode), electrolyte and cathode (positive electrode) are designated 11, 12, and 13, respectively, with the anode 11 separated from the cathode 13 by the electrolyte 12. Suitable terminals designated 14 are provided in electronic contact with the anode 11 and the cathode 13. The cell 15 is contained in a housing, designated 16, which insulates the anode from the cathode. The cell 15 may include, at the cathode 13, vanadium oxide material according to the present invention.

Objects and advantages of this invention are further illustrated by the following examples, but the particular materials and amounts thereof recited in these examples, as well as other conditions and details, should not be construed to unduly limit this invention.

Experimental

A. Preparation of Materials $Li_{1.2}V_3O_8$ 1.2 moles of $LiOH.H_2O$ (Aldrich Chemical Co., Milwaukee, Wis.) and 3 moles of $NH_4VO_3$ (Aldrich) were suspended in methanol and milled in a Sweco (paint shaker) mill (Sweco, Florence, Ky.) in a polyethylene container with yttria stabilized $ZrO_2$ grinding spheres (Tosoh Corporation, Tokyo, Japan) for 48 hours. The methanol was evaporated by heating above 70° C. in a fumehood and the dry solid precursor was heat treated in air. The sample was heated to 400° C. at a rate of 1° C./minute, and held at 400° C. for 24 hours, then allowed to cool to room temperature (1° C./minute cooling rate). The product was ground manually to a fine powder and submitted for phase identification by powder X-ray diffraction on a Seimens D-5000 diffractometer (Madison, Wis.) (FIG. 1).

Figure 2:
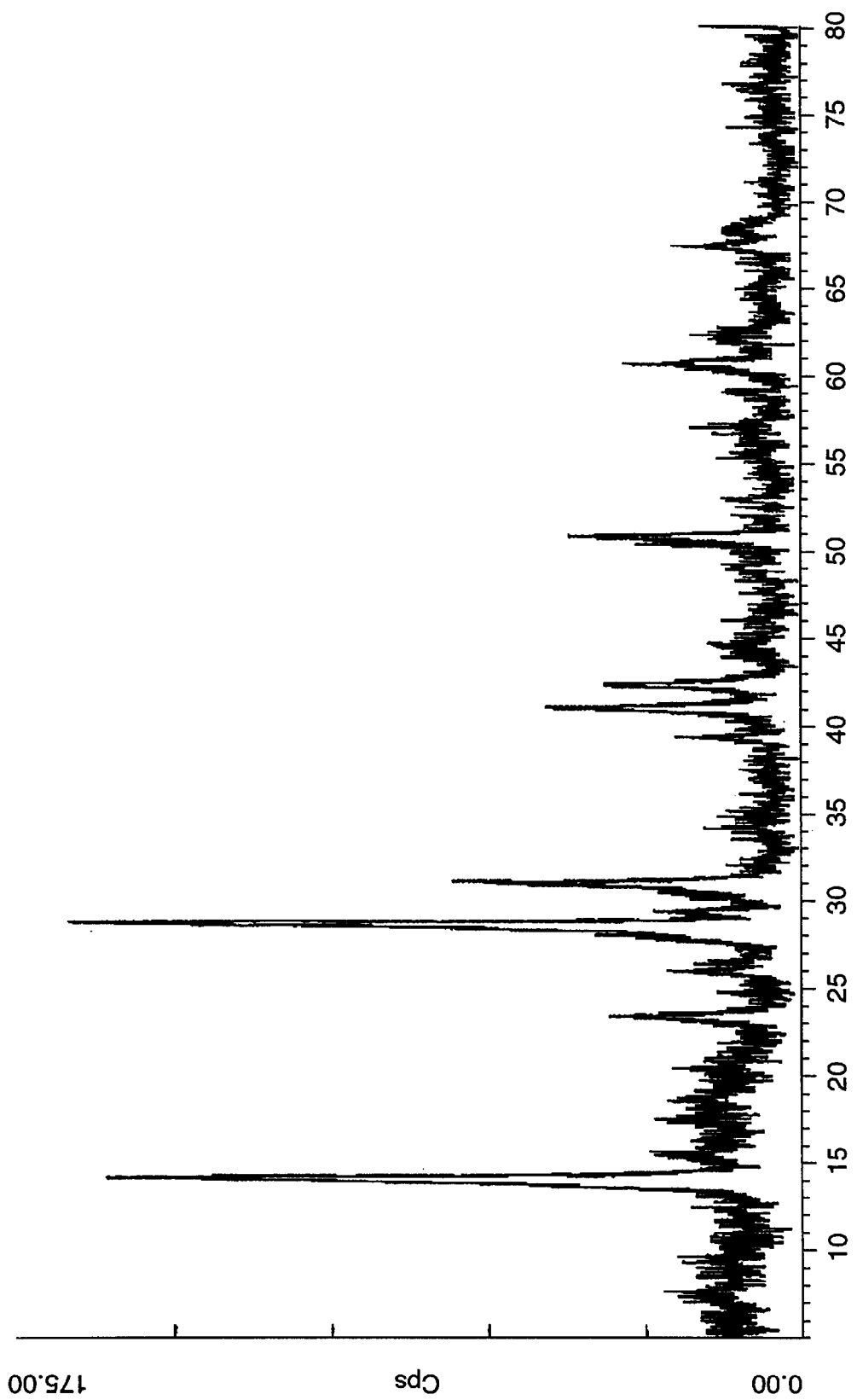
FIG. 2 is the powder X-ray diffraction pattern of a $Li_{1.2}V_{2.8}Ti_{0.1}Mo_{0.1}O_8$ material.

$Li_{1.2}V_{2.8}Ti_{0.1}Mo_{0.1}O_8$ 1.2 moles of $LiOH.H_2O$, 2.8 moles of $NH_4VO_3$, 0.1 mole of $Ti[OCH(CH_3)_2]_4$ (Aldrich), and 0.1 mole of $MoO_3$ (Aldrich) were suspended in methanol and milled as described above for 48 hours. The methanol was evaporated by heating above 70° C. in a fumehood and the dry white solid precursor was heat treated in air. The sample was heated to 400° C. at a rate of 1° C./minute, and held at 400° C. for 24 hours, then allowed to cool to room temperature (1° C./minute cooling rate). The product was ground manually to a fine powder and submitted for phase identification by powder X-ray diffraction on a Seimens D-5000 diffractometer (FIG. 2).

Figure 3:
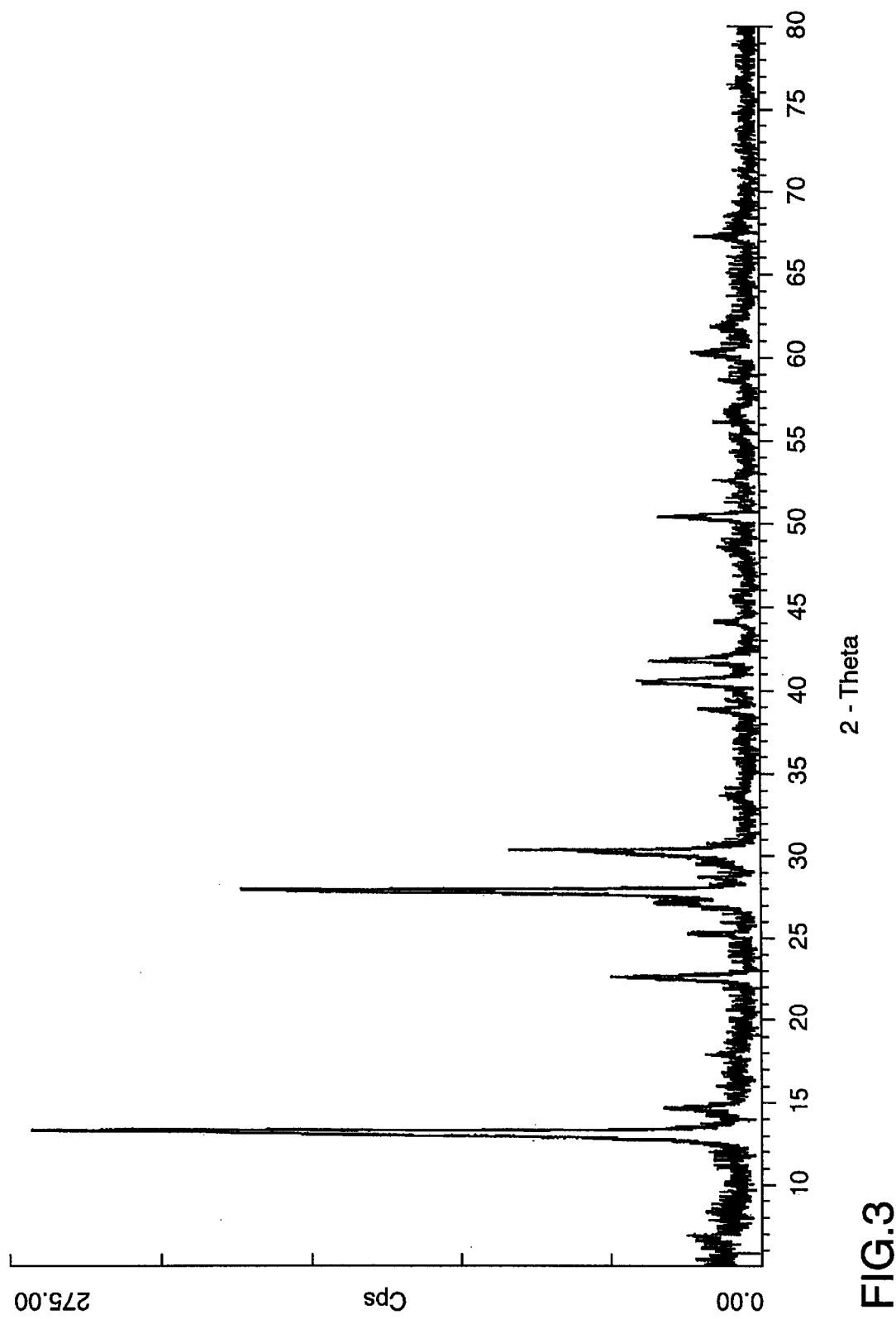
FIG. 3 is the powder X-ray diffraction pattern of a $Li_{1.2}V_{2.9}Ti_{0.05}Mo_{0.05}O_8$ material.

$Li_{1.2}V_{2.9}Ti_{0.05}Mo_{0.05}O_8$ 1.2 moles of $LiOH.H_2O$, 2.9 moles of $NH_4VO_3$, 0.05 mole of $Ti[OCH(CH_3)_2]_4$, and 0.05 mole of $MoO_3$ were suspended in methanol and milled as described above for 48 hours. The methanol was evaporated by heating above 70° C. in a fumehood and the dry white solid precursor was heat treated in air. The sample was heated to 400° C. at a rate of 1° C./minute, and held at 400° C. for 24 hours, then allowed to cool to room temperature (1° C./minute cooling rate). The product was ground manually to a fine powder and submitted for phase identification by powder X-ray diffraction on a Seimens D-5000 diffractometer (FIG. 3).

Figure 4:
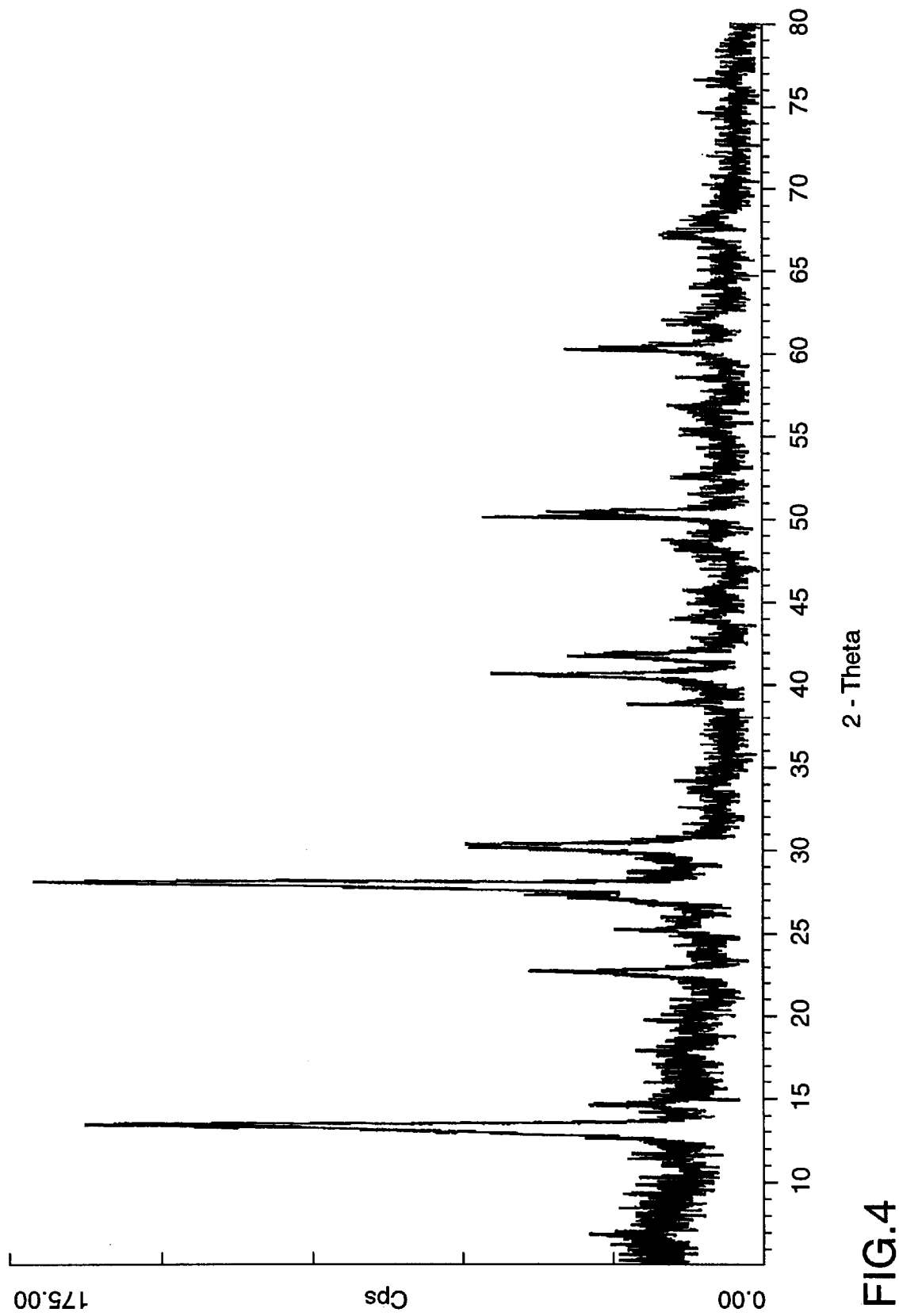
FIG. 4 is the powder X-ray diffraction pattern of a $Li_{1.2}V_{2.8}Zr_{0.1}Mo_{0.1}O_8$ material.

$Li_{1.2}V_{2.8}Zr_{0.1}Mo_{0.1}O_8$ 1.2 moles of $LiOH.H_2O$, 2.8 moles of $NH_4VO_3$, 0.1 mole of $Zr[OCH(CH_3)_2]_4(CH_3)_2CHOH$ (Aldrich), and 0.1 mole of $MoO_3$ were suspended in methanol and milled as described above for 48 hours. The methanol was evaporated in a fumehood above 70° C. and the dry white solid precursor was heat treated in air. The sample was heated to 400° C. at a rate of 1° C./minute, and held at 400° C. for 24 hours, then allowed to cool to room temperature (1° C./minute cooling rate). The product was ground manually to a fine powder and submitted for phase identification by powder X-ray diffraction on a Seimens D-5000 diffractometer (FIG. 4).

Figure 5:
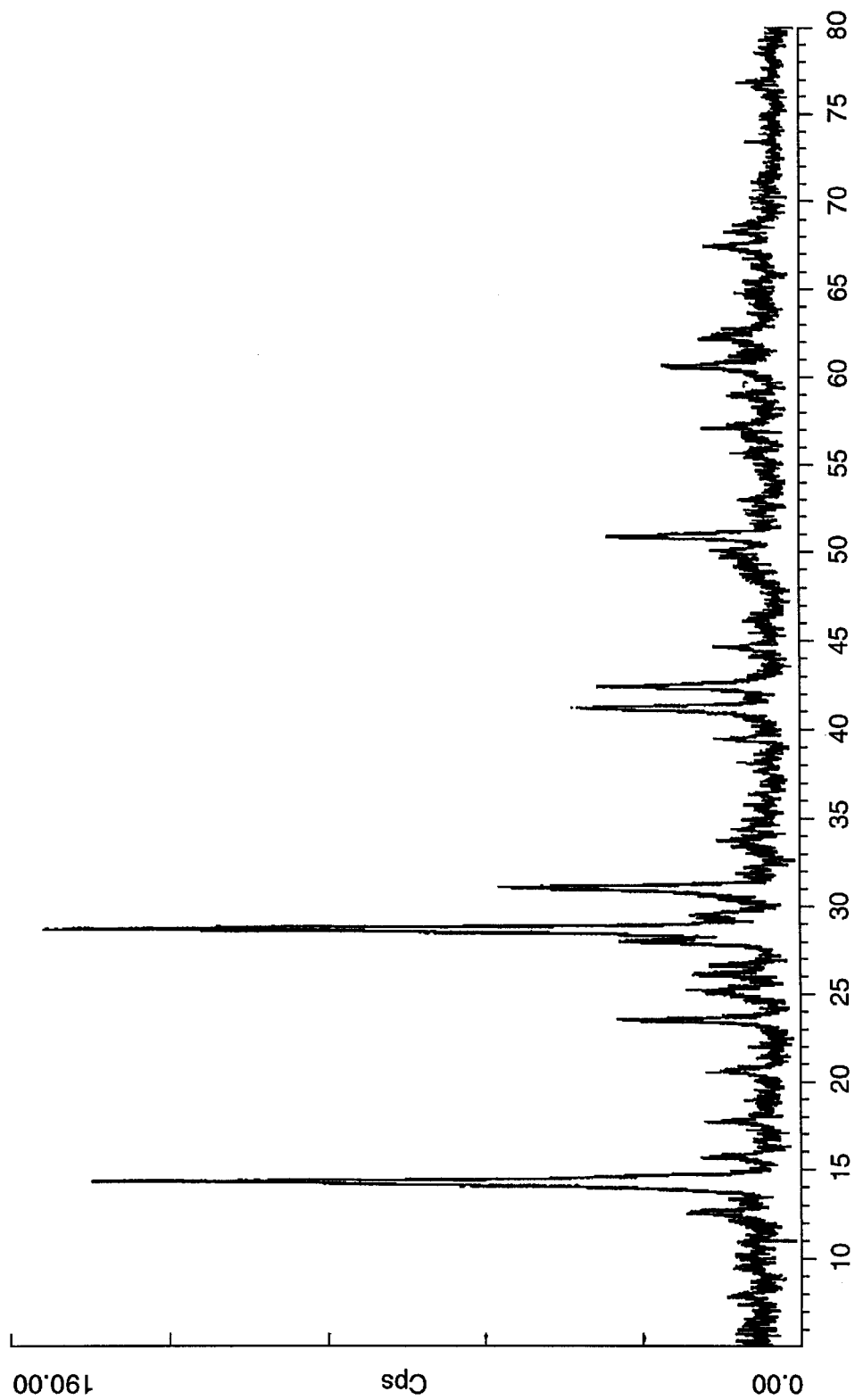
FIG. 5 is the powder X-ray diffraction pattern of a $Li_{1.2}V_{2.7}Y_{0.1}Mo_{0.2}O_8$ material.

$Li_{1.2}V_{2.7}Y_{0.1}Mo_{0.2}O_8$ 1.2 moles of $LiOH \cdot H_2O$, 2.7 moles of $NH_4VO_3$, 0.02 mole of $Y_5O[OCH(CH_3)_2]_{13}$ (Chemat, Northbridge, Calif.), and 0.2 moles of $MoO_3$ were suspended in methanol and milled as described above for 48 hours. The methanol was evaporated in a fumehood above 70° C. and the dry white solid precursor was heat treated in air. The sample was heated to 400° C. at a rate of 1° C./minute, and held at 400° C. for 24 hours, then allowed to cool to room temperature (1° C./minute cooling rate). The product was ground manually to a fine powder and submitted for phase identification by powder X-ray diffraction on a Seimens D-5000 diffractometer (FIG. 5).

Figure 6:
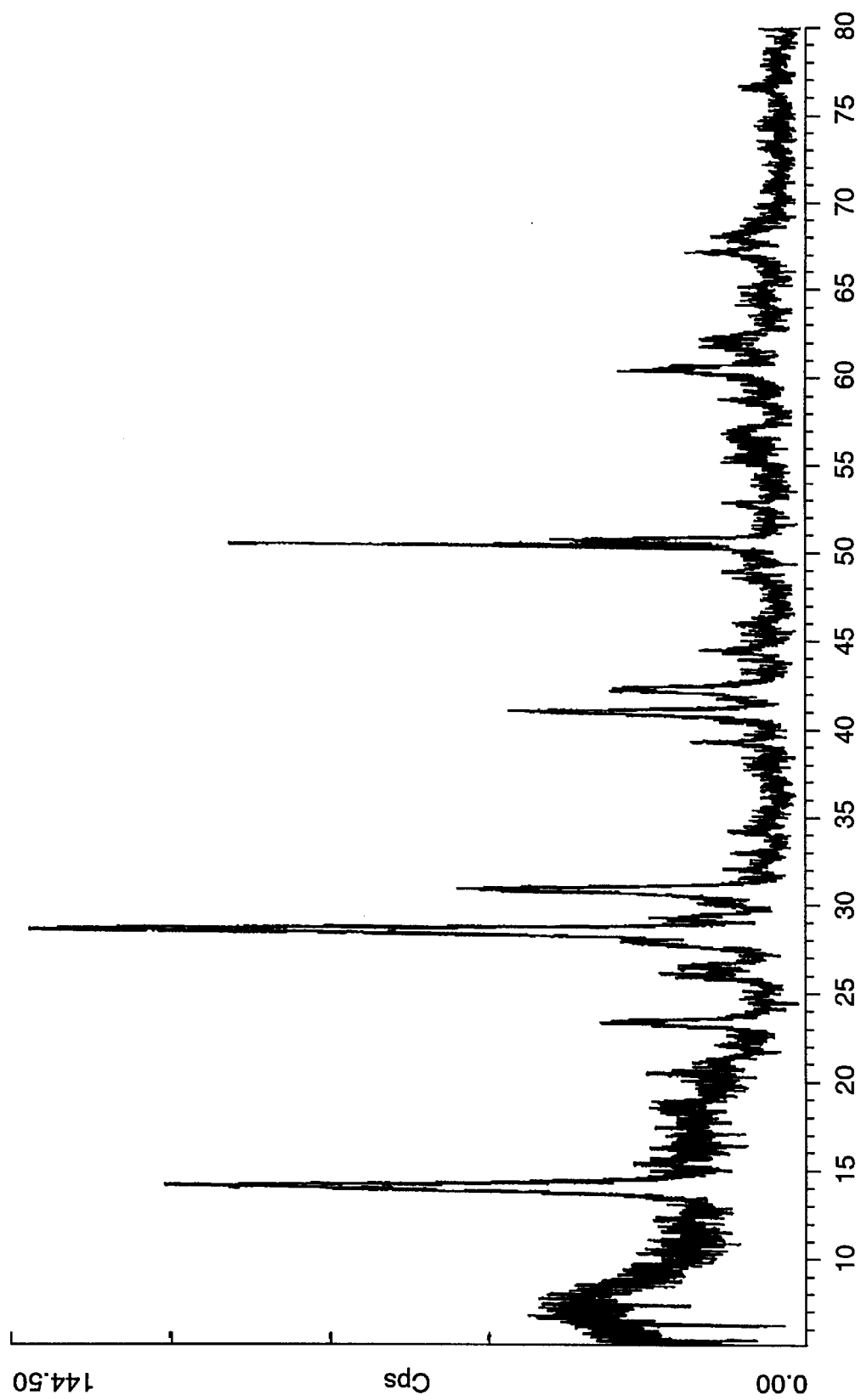
FIG. 6 is the powder X-ray diffraction pattern of a $Li_{1.2}V_{2.7}Sc_{0.1}Mo_{0.2}O_8$ material.

$Li_{1.2}V_{2.7}Sc_{0.1}Mo_{0.2}O_8$ 1.2 moles of $LiOH \cdot H_2O$, 2.7 moles of $NH_4VO_3$, 0.1 mole of $Sc[OCH(CH_3)_2]_3$ (Chemat, Northbridge, Calif.), and 0.2 mole of $MoO_3$ were suspended in methanol and milled as described above for 48 hours. The methanol was evaporated in a above 70° C. and the dry white solid precursor was heat treated in air. The sample was heated to 400° C. at a rate of 1° C./minute, and held at 400° C. for 24 hours, then allowed to cool to room temperature (1° C./minute cooling rate). The product was ground manually to a fine powder and submitted for phase identification by powder X-ray diffraction on a Seimens D-5000 diffractometer (FIG. 6).

B. Alternative Synthesis for Molybdenum and Group IV Transition Metal Doping of $Li_{1.2}V_3O_8$ Structure An alternative method to the synthesis described above in part A, is a synthesis having a two step process which involves the preparation of a vanadium-molybdenum-group IV oxide precursor, such as a vanadium-molybdenum-titanium precursor, which is then reacted with a lithium containing reagent.

Figure 7:
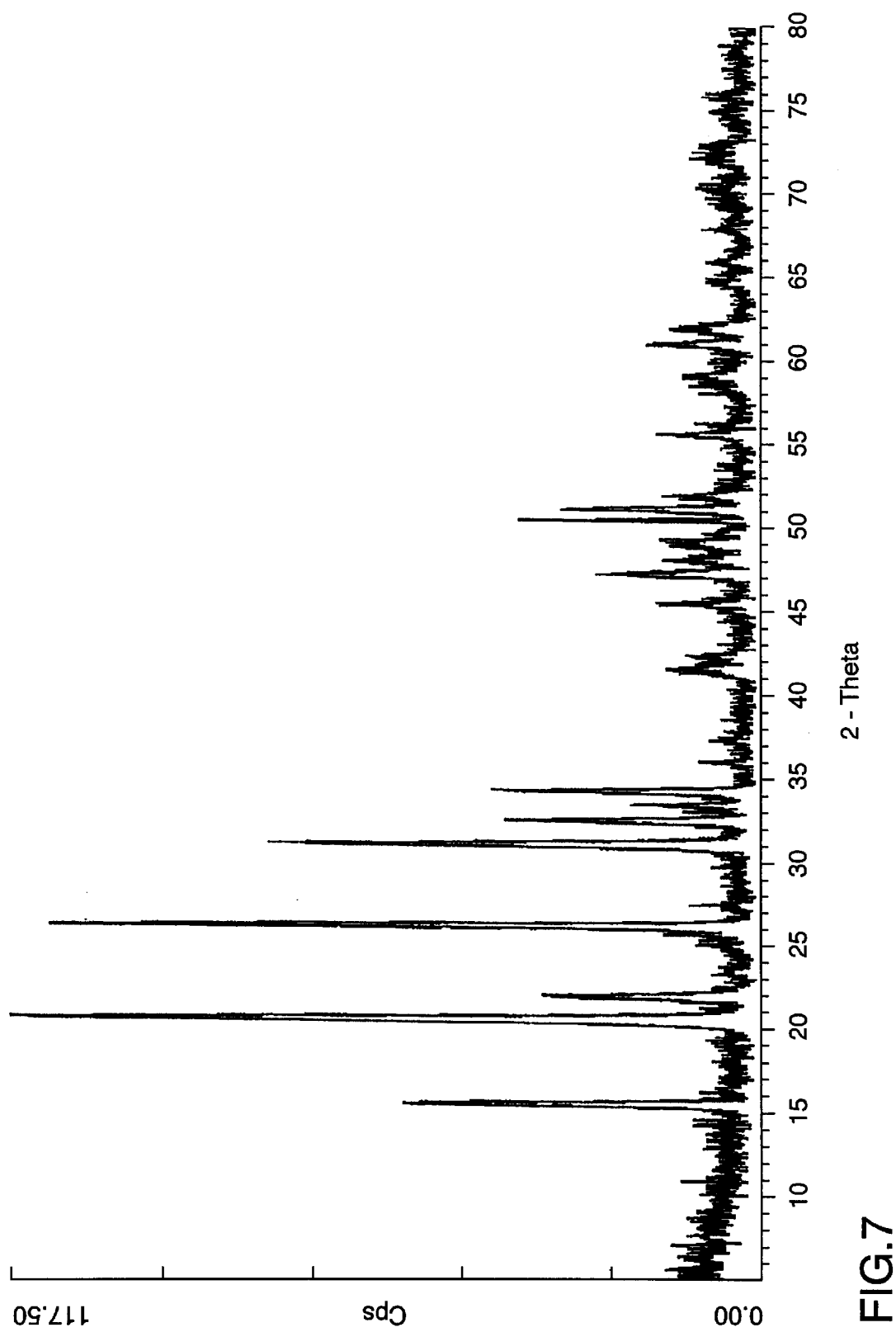
FIG. 7 is the powder X-ray diffraction pattern of a $V_{1.8}Ti_{0.1}Mo_{0.1}O_5$ precursor material.

$V_{2-2x}Ti_xMo_xO_5$ Precursor 1.8 moles of $NH_4VO_3$, 0.1 mole of $Ti[OCH(CH_3)_2]_4$, and 0.1 mole of $MoO_3$ were suspended in methanol and milled as described above for 48 hours. The methanol was evaporated in a fumehood above 70° C. and the solid was heated in air. The sample was subsequently heated to 600° C. at a rate of 1° C./minute, and held at 600° C. for 24 hours, then allowed to cool to room temperature (1° C./minute cooling rate). The product was ground manually to a fine powder and submitted for phase identification by powder X-ray diffraction on a Seimens D-5000 diffractometer (FIG. 7).

Figure 8:
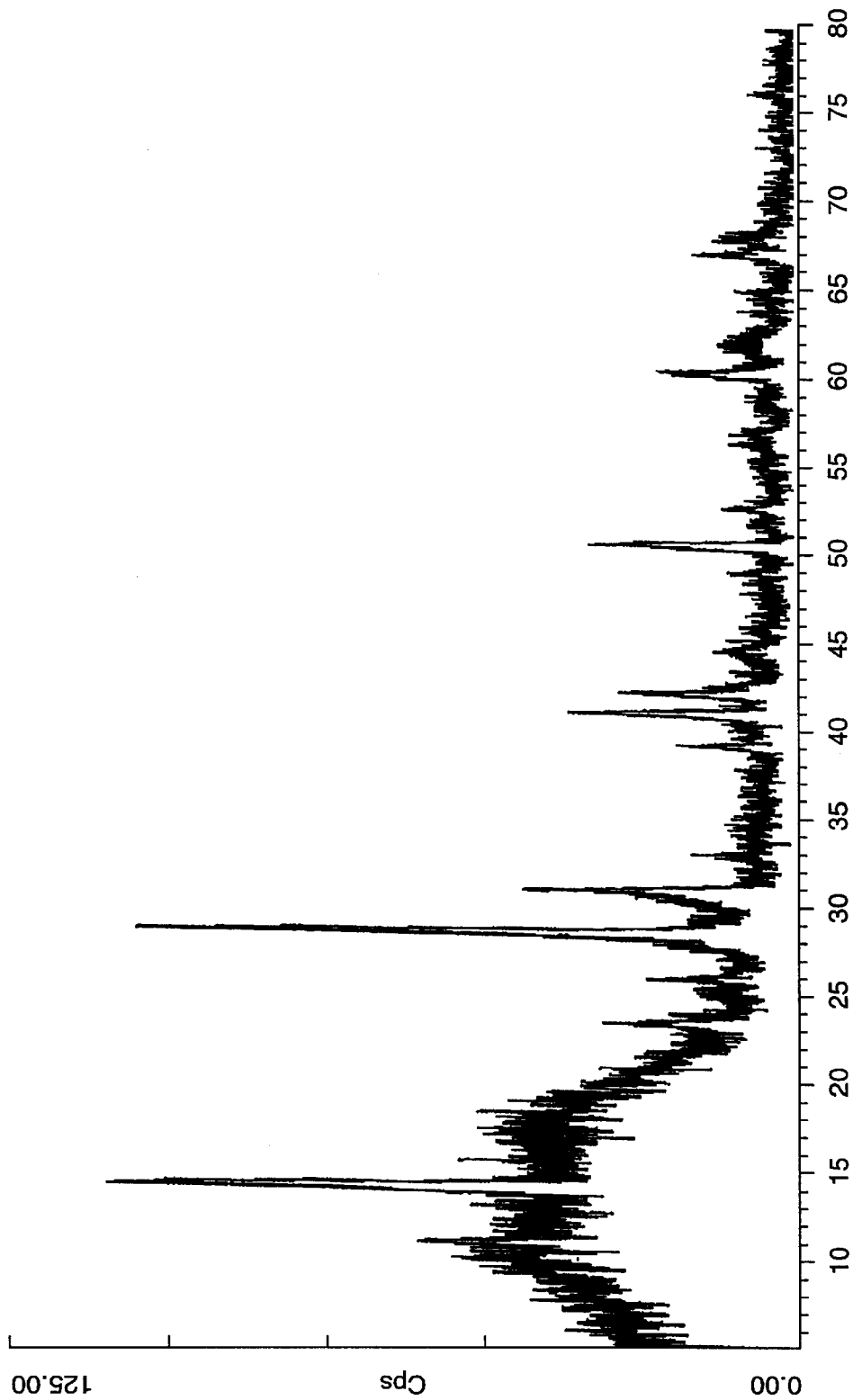
FIG. 8 is the powder X-ray diffraction pattern of a $Li_{1.2}V_{2.7}Ti_{0.15}Mo_{0.15}O_8$ material derived from the precursor in FIG. 7.

$Li_{1.2}V_{2.7}Ti_{0.15}Mo_{0.15}O_8$ 1.2 moles of $LiOH \cdot H_2O$ and 1.5 moles of $V_{2-2x}Ti_xMo_xO_5$ (as prepared above with x=0.1) were suspended in methanol and milled as described above for 48 hours. The methanol was evaporated in a fumehood above 70° C. and the solid was heat treated in air. The sample was heated to 400° C. at a rate of 1° C./minute, and held at 400° C. for 24 hours, then allowed to cool to room temperature (1° C./minute cooling rate). The product was ground manually to a fine powder and submitted for phase identification by powder X-ray diffraction on a Seimens D-5000 diffractometer (FIG. 8).

C. Electrochemical Testing

The materials prepared above were screened for electrochemical performance in "1225" or "2032" coin cells (12 mm×2.5 mm high and 20 mm×3.2 mm high, respectively).

Blended materials for cathode laminates were prepared by: 1) mixing by weight 81% active material, 10% KYNAR (binder) (Elf-Atochem, Philadelphia, Pa.), and 9% carbon (Cabot Corporation, Boston, Mass.); and 2) ball milling the materials in a Sweco (paint shaker) mill (Sweco, Florence, Ky.) in tetrahydrofuran (Aldrich) or 1-methyl-2-pyrrolidinone (Aldrich) with yttria stabilized $ZrO_2$ grinding spheres (Tosoh Corporation, Tokyo, Japan).

Laminates were prepared by a doctor blade, whereby a slurry of the blended materials described above were evenly coated onto a thin Al foil about 21 microns thick, and thereafter dried overnight in a vacuum oven at 80° C. The electrolyte used for electrochemical evaluations was a 1 Molar solution of $LiPF_6$ (Kerr-McGee, Oklahoma City, Okla.) dissolved in a 50:50 mixture (by volume) of dimethyl carbonate (DMC) and ethylene carbonate (EC) (Kerr-McGee, Oklahoma City, Okla.). $Li/1.0M\ LiPF_6$, DMC, $EC/Li_xV_{3-\delta}M_\delta O_y$ cells were cycled at constant current (typically 0.1 milliamp (mA)) between 3.1–2.1 volts (V).

Electrochemical Data

Figure 9:
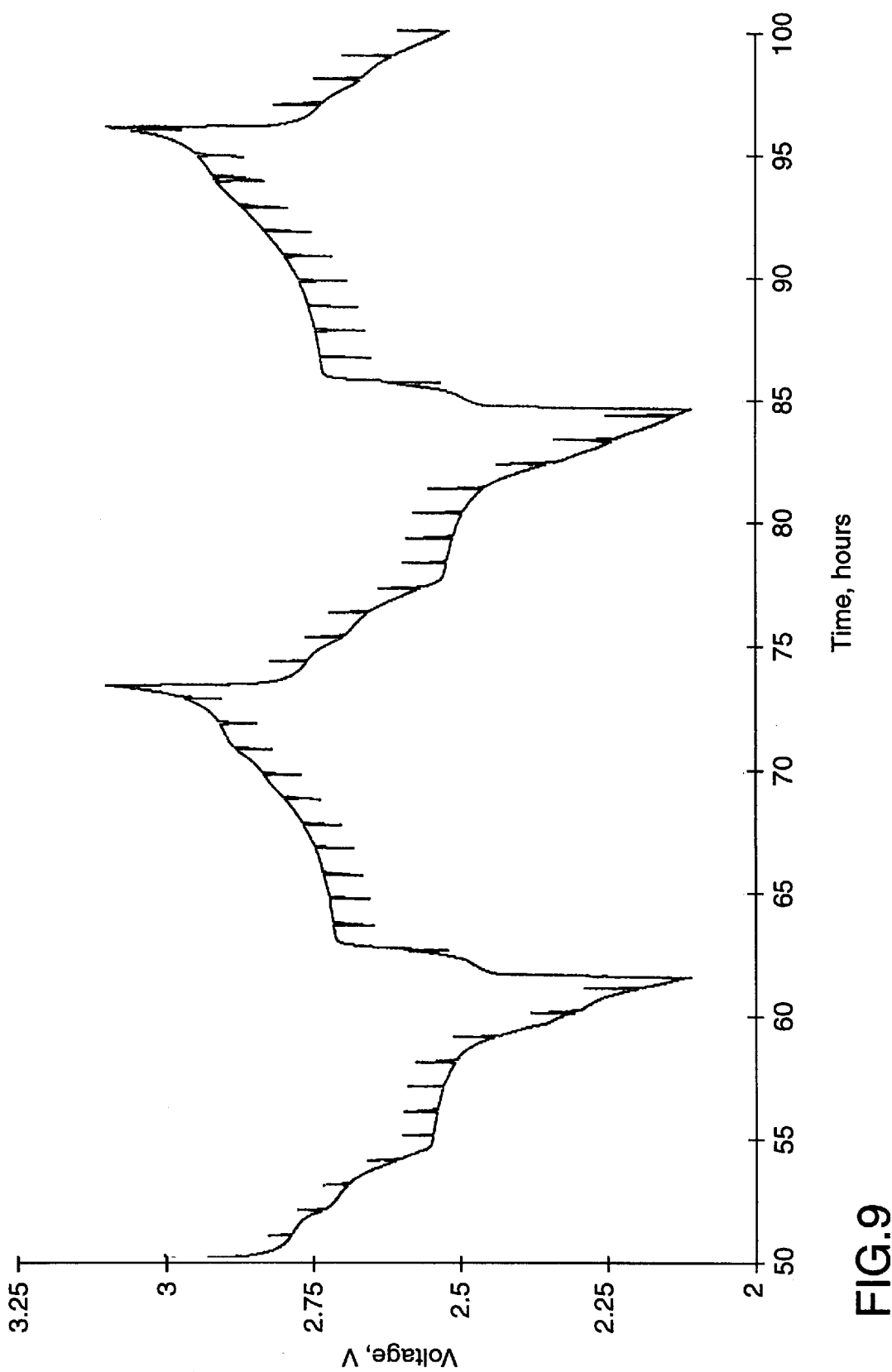
FIG. 9 is a typical voltage profile for a standard $Li/Li_{1.2}V_3O_8$.
Figure 10:
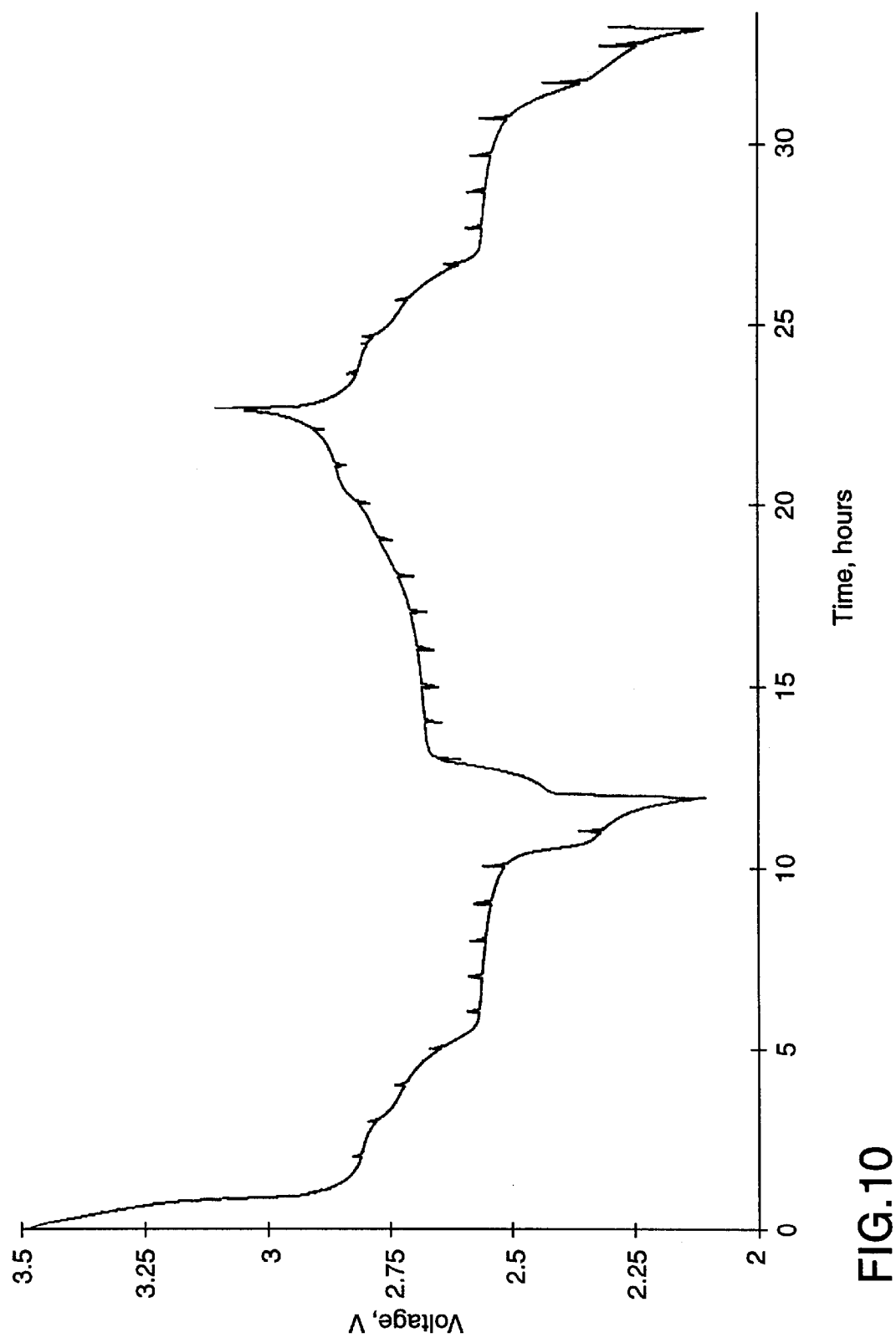
FIG. 10 is a typical voltage profile for a $Li/Li_xV_{3-\delta}M_\delta O_y$ cell of the present invention.
Figure 11:
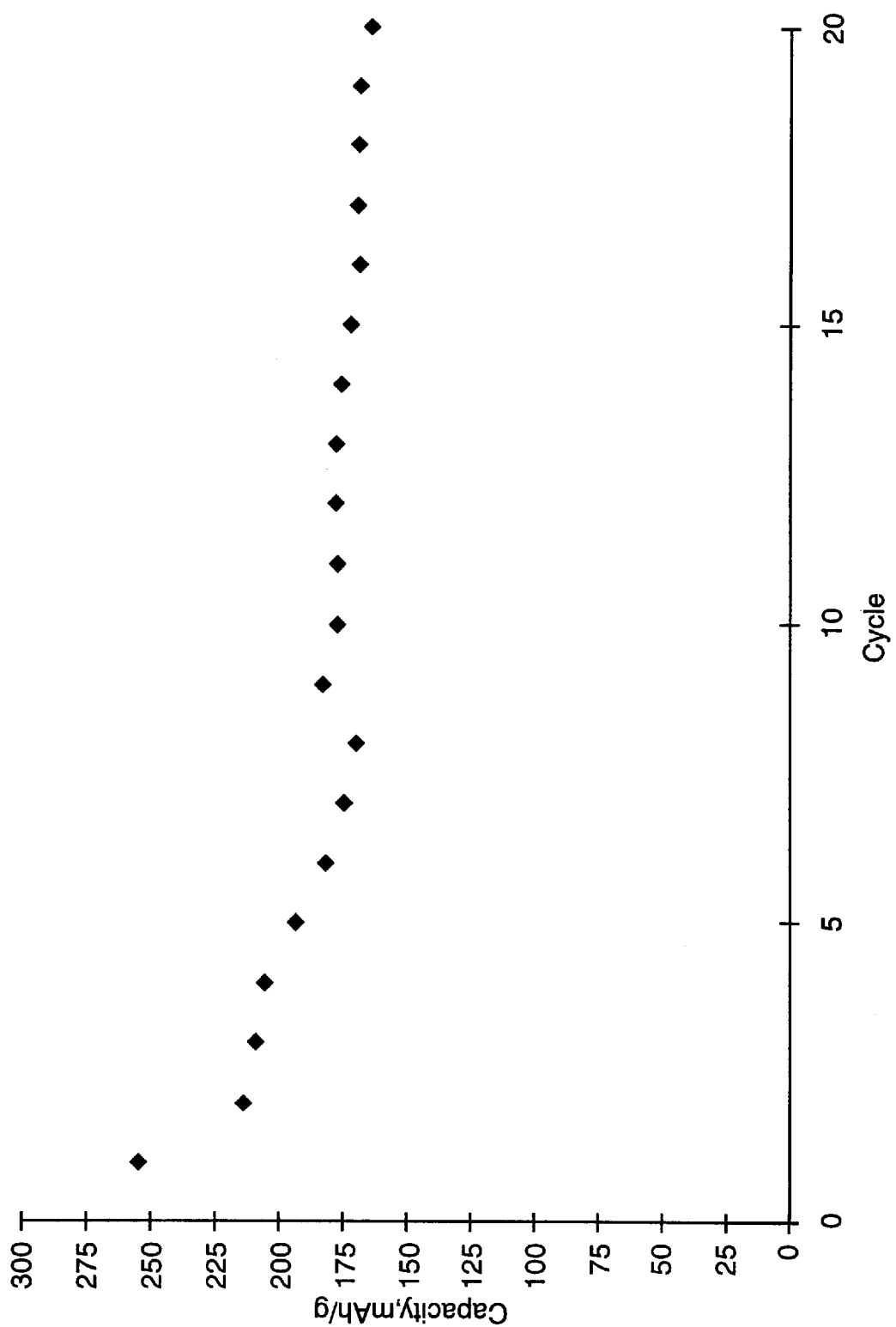
FIG. 11 is the capacity vs. cycle number plot for a standard $Li/Li_{1.2}V_3O_8$ cell for 20 cycles.
Figure 12:
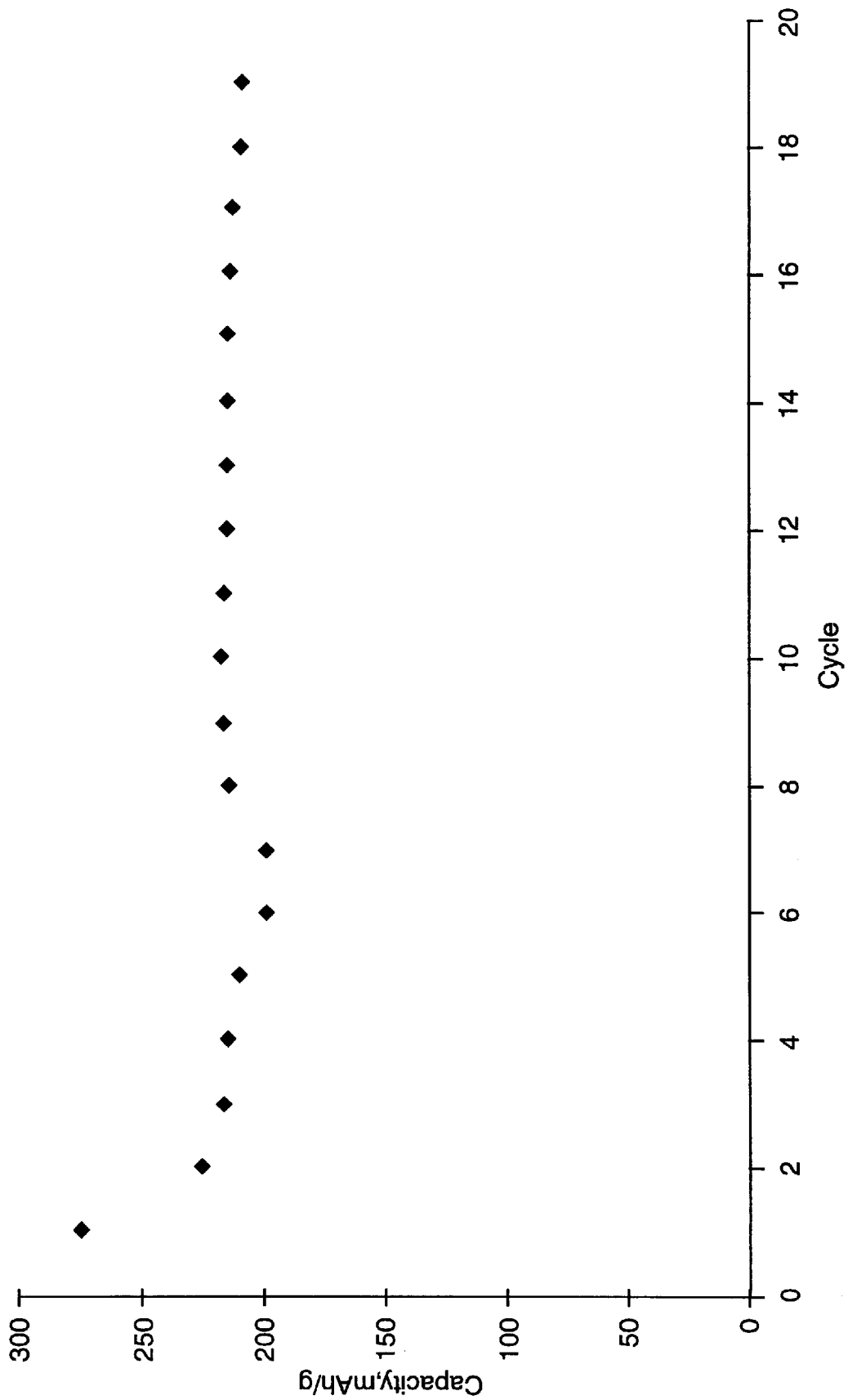
FIG. 12 is the capacity vs. cycle number plot for a $Li/Li_{1.2}V_{2.8}Ti_{0.1}Mo_{0.1}O_8$ cell for 20 cycles.
Figure 13:
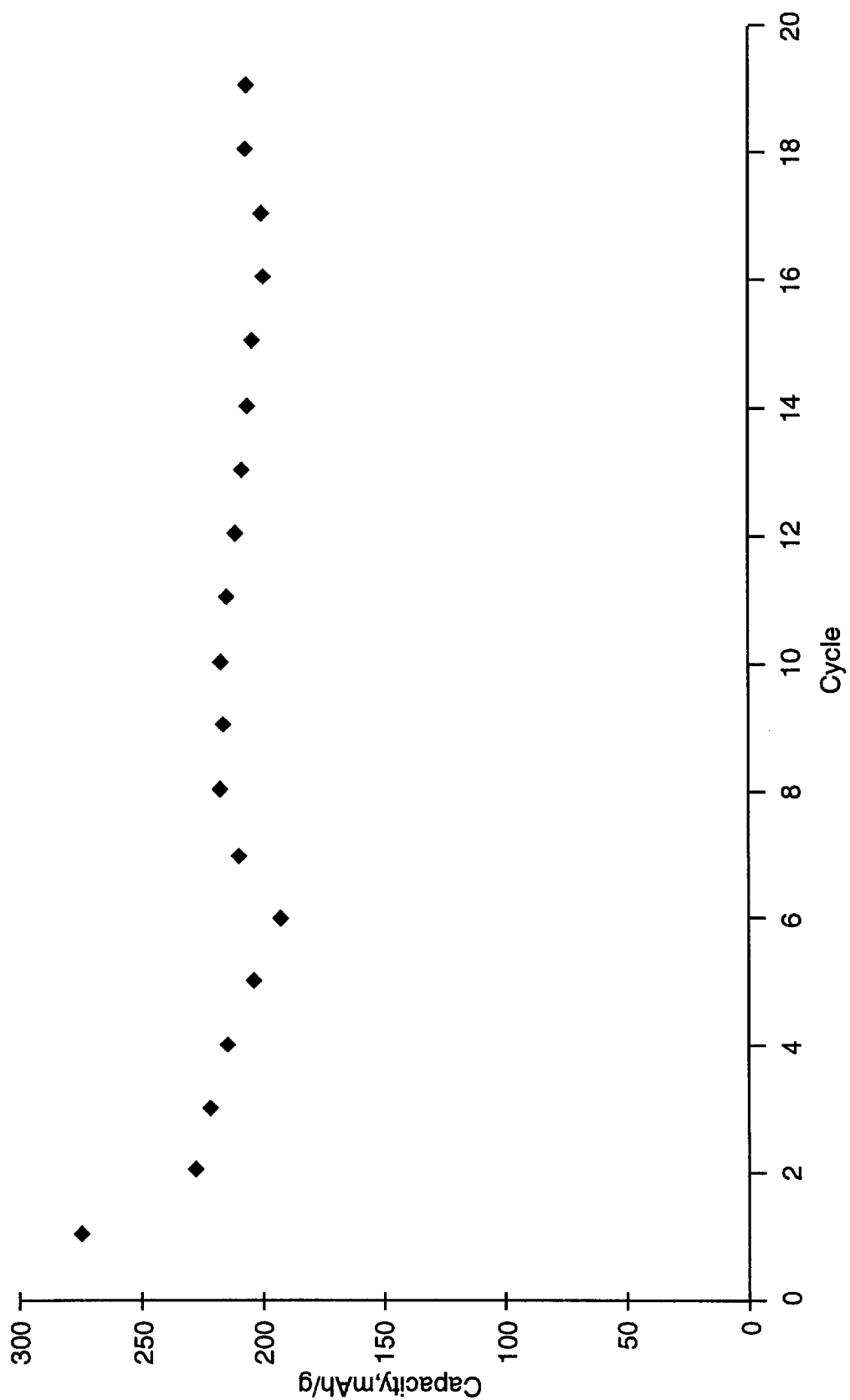
FIG. 13 is the capacity vs. cycle number plot for a $Li/Li_{1.2}V_{2.9}Ti_{0.05}Mo_{0.05}O_8$ cell for 20 cycles.
Figure 14:
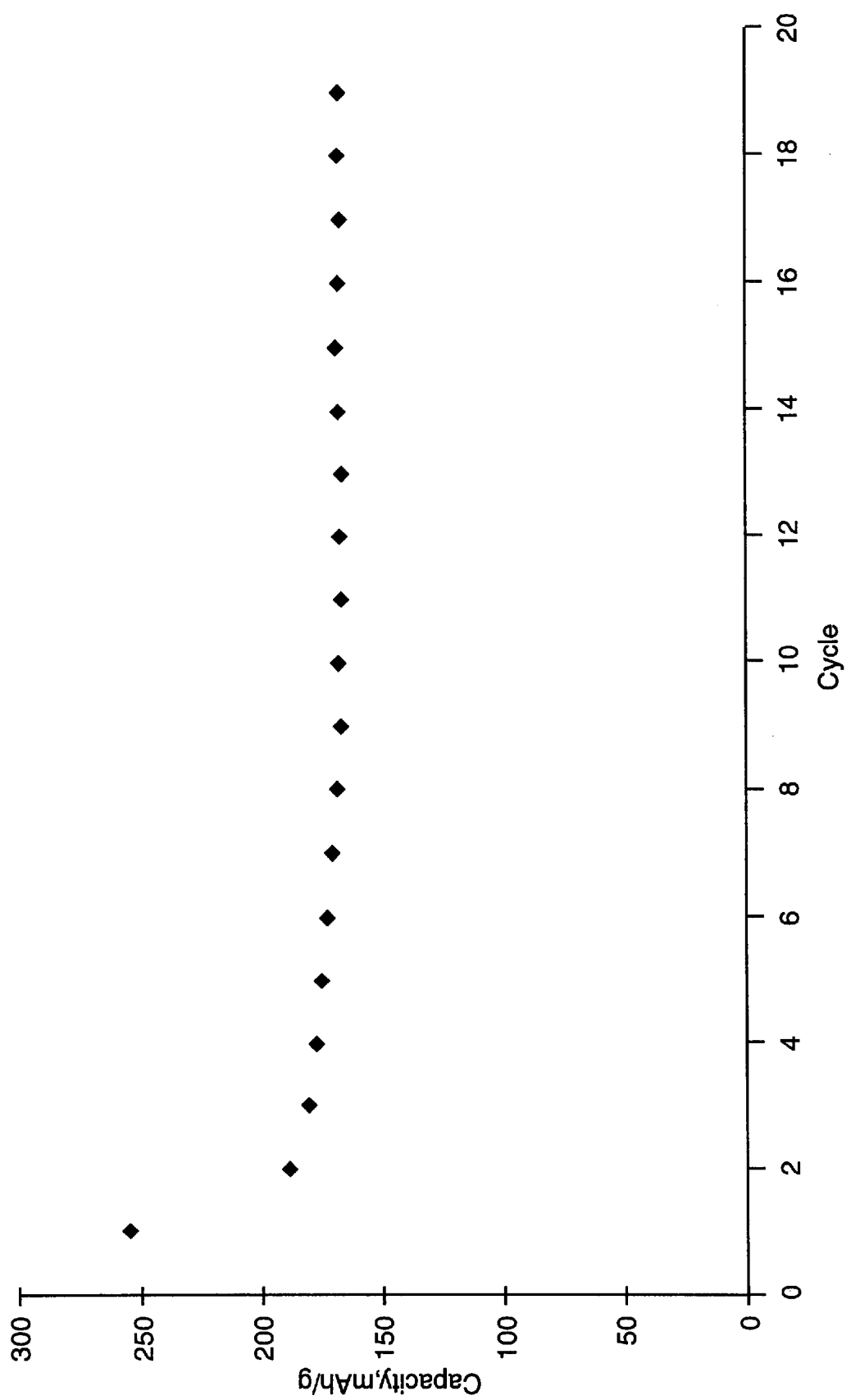
FIG. 14 is the capacity vs. cycle number plot for a $Li/Li_{1.2}V_{2.8}Zr_{0.1}Mo_{0.1}O_8$ cell for 20 cycles.
Figure 15:
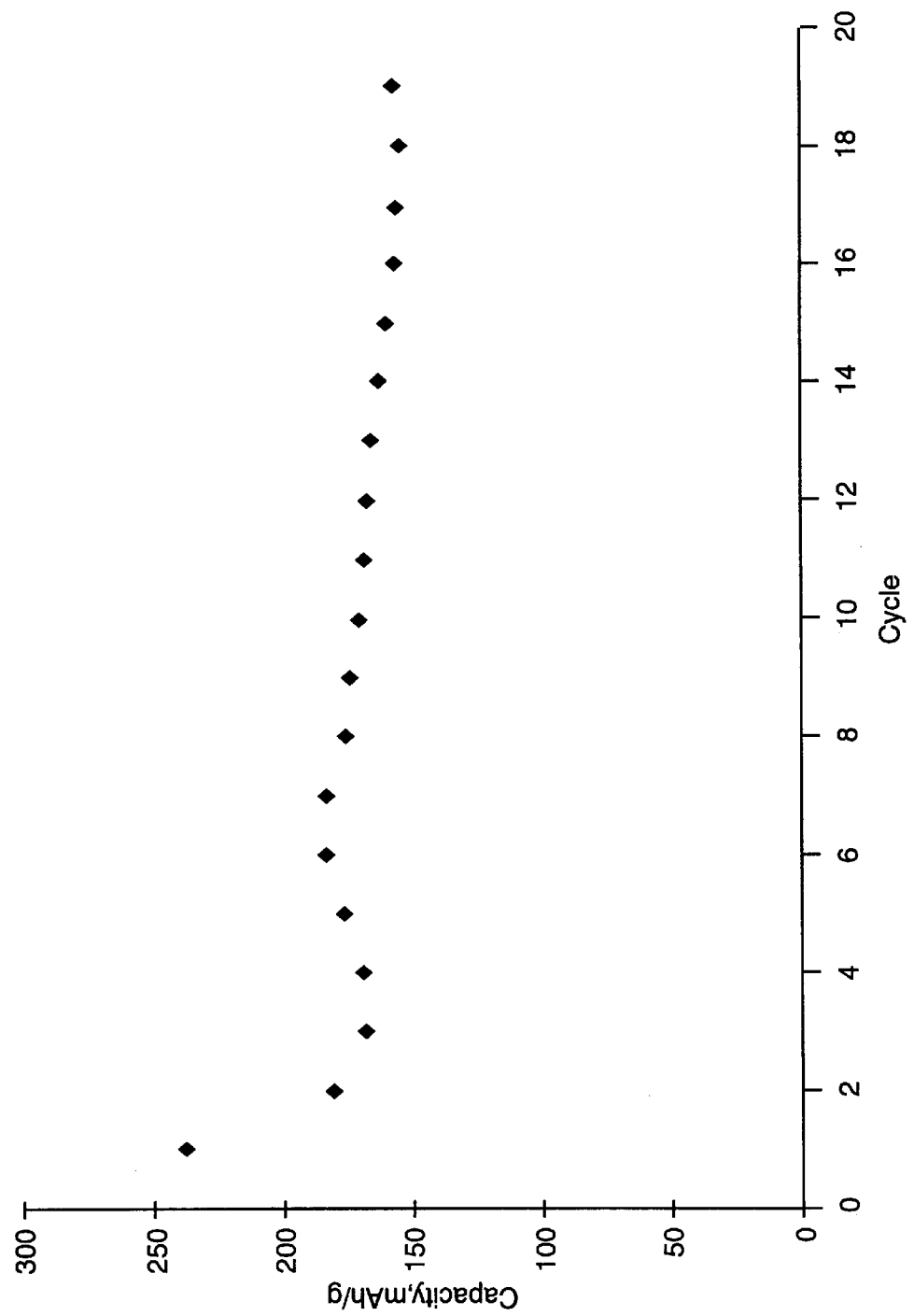
FIG. 15 is the capacity vs. cycle number plot for a $Li/Li_{1.2}V_{2.7}Y_{0.1}Mo_{0.2}O_8$ cell for 20 cycles.
Figure 16:
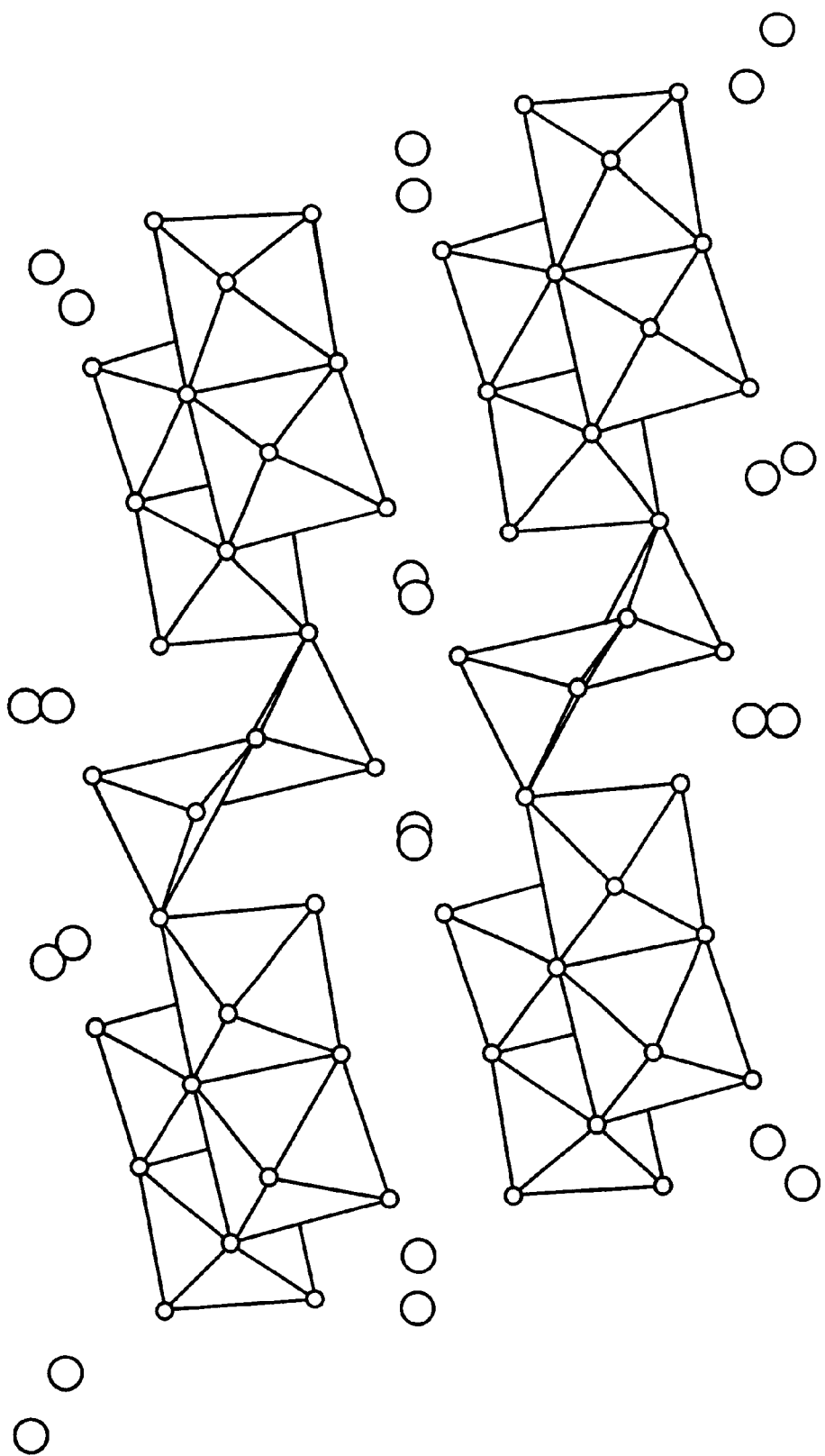
FIG. 16 is a representation of the structure of $Li_{1.2}V_3O_8$.
Figure 17:
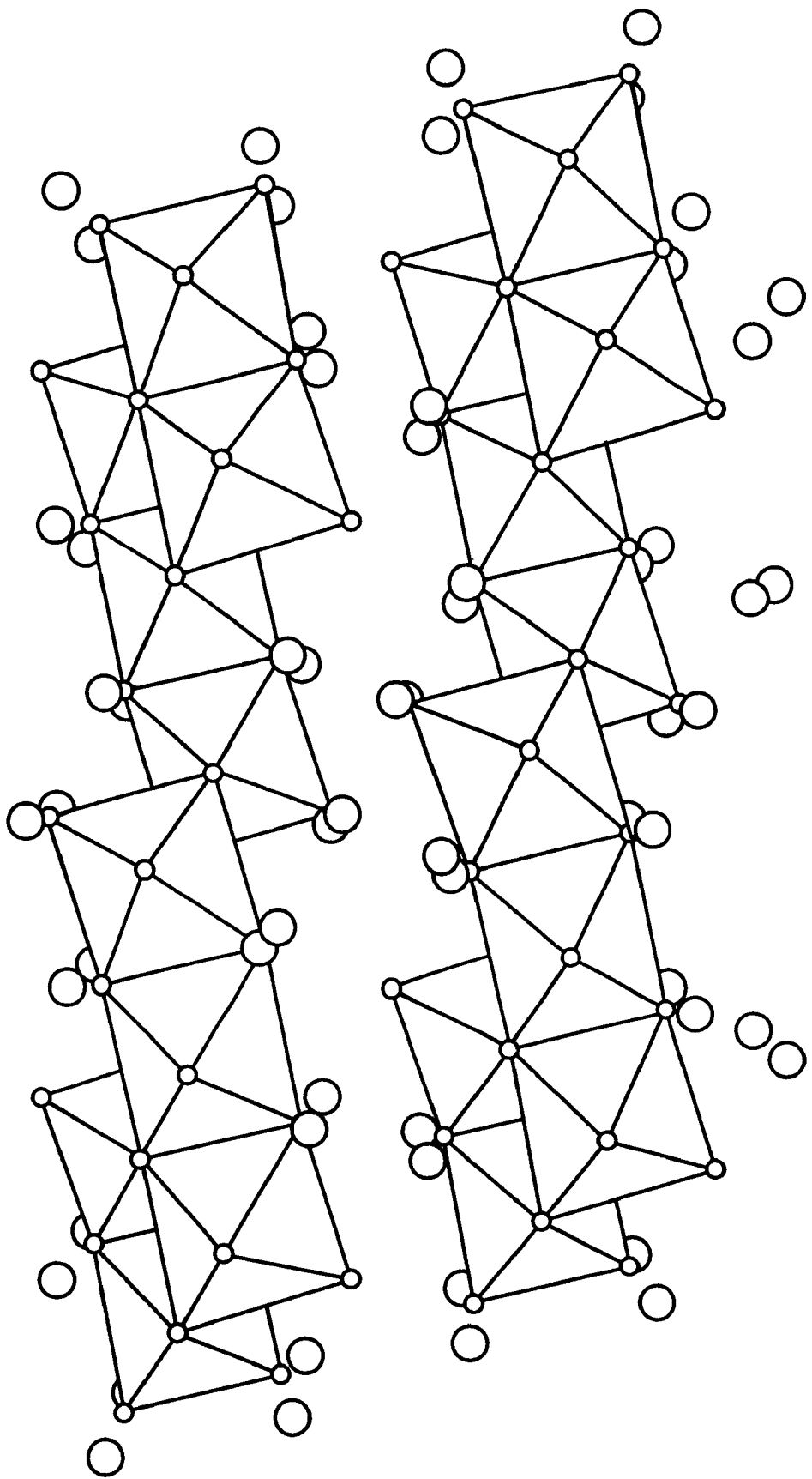
FIG. 17 is a structural representation of a discharged electrode product $Li_4V_3O_8$.

A typical voltage profile that is obtained during cycling of a standard $Li/Li_{1.2}V_3O_8$ cell is provided in FIG. 9. A typical voltage profile of a typical $Li/Li_xV_{3-\delta}M_\delta O_y$ cell of the present invention is provided in FIG. 10.

Individual plots of discharge capacity vs. cycle number for a standard $Li/Li_{1.2}V_3O_8$ cell, for a $Li/Li_{1.2}V_{2.8}Ti_{0.1}Mo_{0.1}O_8$ cell, for a $Li/Li_{1.2}V_{2.9}Ti_{0.05}Mo_{0.05}O_8$ cell, for a $Li/Li_{1.2}V_{2.8}Zr_{0.1}Mo_{0.1}O_8$ cell, and for a $Li/Li_{1.2}V_{2.7}Y_{0.1}Mo_{0.02}O_8$ cell in accordance with this invention are shown in FIGS. 11, 12, 13, 14 and 15, respectively. It was usually found that one "break-in" cycle with a relatively high initial discharge capacity was necessary before the electrode provided stable electrochemical cycling. The superior cycling stability of the $Li_xV_{3-\delta}M_\delta O_y$ electrodes of the present invention compared to a standard $Li_{1.2}V_3O_8$ electrode after the first cycle is clearly evident in FIGS. 11 to 15. This is also demonstrated in Table 1, in which the electrode capacities delivered at cycle 2 and at cycle 20 are listed as well as the overall capacity fade (as a percentage) between cycles 2 and 20 for various $Li/Li_xV_{3-\delta}M_\delta O_y$ cells.

TABLE 1

Performance of $Li_xV_{3-\delta}M_\delta O_y$ electrodes in $Li/Li_xV_{3-\delta}M_\delta O_y$ cells

| Electrode Material | Capacity (mAh/g) Cycle 2 | Capacity (mAh/g) Cycle 20 | Capacity Fade (%) (Cycle 2 to 20) |
|---|---|---|---|
| $Li_{1.2}V_3O_8$(control) | 208 | 162 | 24 |
| $Li_{1.2}V_{2.8}Ti_{0.1}Mo_{0.1}O_8$ | 226 | 209 | 5 |
| $Li_{1.2}V_{2.9}Ti_{0.05}Mo_{0.05}O_8$ | 229 | 204 | 11 |
| $Li_{1.2}V_{2.8}Zr_{0.1}Mo_{0.1}O_8$ | 181 | 165 | 9 |
| $Li_{1.2}V_{2.7}Y_{0.1}Mo_{0.2}O_8$ | 180 | 156 | 13 |
| $Li_{1.2}V_{2.7}Sc_{0.1}Mo_{0.2}O_8$ | 177 | 158 | 11 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents a mixture of at least two different cations.

2. A vanadium oxide material according to claim 1, wherein M is selected from the group consisting of Mg, Al, Si, P, Sc, Ti, Cr, Mn, Fe, Co, Ni, Cu, Zn, Ge, Y, Zr, Nb, Ta, Mo, La, Hf, W, and mixtures thereof.

3. A vanadium oxide material according to claim 2, wherein M is selected from the group consisting of Mg, Al, Si, Sc, Ti, Y, Zr, Mo, and mixtures thereof.

4. A vanadium oxide material according to claim 3, wherein M is selected from the group consisting of Mg, Al, Ti, Y, Zr, Mo, and mixtures thereof.

5. A vanadium oxide material according to claim 1, where in the average, calculated oxidation state of V is at least 4.85.

6. A vanadium oxide material according to claim 1, wherein x is about 1.0 to about 1.5.

7. An electrode comprising a vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents a mixture of at least two different cations.

8. An electrode according to claim 7, wherein the average, calculated oxidation state of V is at least 4.85.

9. An electrode according to claim 7, wherein M is selected from the group consisting of Mg, Al, Si, P, Sc, Ti, Cr, Mn, Fe, Co, Ni, Cu, Zn, Ge, Y, Zr, Nb, Ta, Mo, La, Hf, W, and mixtures thereof.

10. An electrode according to claim 9, wherein M is selected from the group consisting of Mg, Al, Si, Sc, Ti, Y, Zr, Mo, and mixtures thereof.

11. It An electrode according to claim 10, wherein M is selected from the group consisting of Mg, Al, Ti, Y, Zr, Mo, and mixtures thereof.

12. An electrode according to claim 7, further comprising a binder and conductive material.

13. An electrochemical cell comprising a cathode comprising a vanadium oxide material according to the average formula:

$$Li_xV_{3-\delta}M_\delta O_y$$

wherein:
(a) $0<\delta\leq 1.0$;
(b) $7.8<y\leq 8.2$;
(c) x is non-zero;
(d) x and y are selected such that the average, calculated oxidation state of V is at least 4.7; and
(e) M represents a mixture of at least two different cations.

14. An electrochemical cell according to claim 13, wherein M is selected from the group Mg, Al, Si, P, Sc, Ti, Cr, Mn, Fe, Co, Ni, Cu, Zn, Ge, Y, Zr, Nb, Ta, Mo, La, Hf, W, and mixtures thereof.

15. An electrochemical cell according to claim 14 wherein M is selected from the group consisting of Mg, Al, Si, Sc, Ti, Y, Zr, Mo, and mixtures thereof.

16. An electrochemical cell according to claim 15 wherein M is selected from the group consisting of Mg, Al, Ti, Y, Zr, Mo, and mixtures thereof.

17. An electrochemical cell according to claim 16 wherein M comprises Ti, Zr, or a mixture thereof.

* * * * *

UNITED STATES PATENT AND TRADEMARK OFFICE
CERTIFICATE OF CORRECTION

PATENT NO. : 6,322,928 B1
DATED : November 27, 2001
INVENTOR(S) : Michael M Thackeray, Arthur J. Kahaian, Keith D. Kepler and Donald R. Vissers It is certified that error appears in the above-identified patent and that said Letters Patent is hereby corrected as shown below:

Title page,
Item [74], *Attorney, Agent or Firm*, delete "Golohardt, PA" and insert in place thereof -- Gebhardt, PA --;

Column 1,
Line 63, delete "$Li_xV_{3-\delta}M^{\delta}O_y$" and insert in place therof -- $Li_xV_{3-\delta}M_{\delta}O_y$ --;

Column 5,
Line 13, delete "$LiOH.H_2O$" and insert in place therof -- $LiOH \cdot H_2O$ --;
Line 38, delete "$Zr[OCH(CH_3)_2]_4. (CH_3)_2CHOH$" and insert in place therof -- $Zr[OCH(CH_3)_2]_4 \cdot (CH_3)_2CHOH$ --;
Line 50, delete "." following "conductive" and preceding "particle";

Column 7,
Line 43, delete "," and insert in place therof -- . --;

Column 8,
Lines 24, 39 and 64, delete "$LiOH.H_2O$" and insert in place therof -- $LiOH \cdot H_2O$ --;

Column 9,
Lines 10, 23 and 54, delete "$LiOH.H_2O$" and insert in place therof -- $LiOH \cdot H_2O$ --;

Column 12,
Line 10, delete "It";
Line 28, insert -- consisting of -- following "group" and preceding "Mg".

Signed and Sealed this

Fourth Day of June, 2002

*Attest:*

*Attesting Officer*

JAMES E. ROGAN
*Director of the United States Patent and Trademark Office*